(12) United States Patent  
Akamatsu

(10) Patent No.: US 6,653,547 B2
(45) Date of Patent: Nov. 25, 2003

(54) SOLAR ENERGY CONVERTER

(75) Inventor: Norio Akamatsu, Jyosanjima-jyutaku 2-105, 9-2, Nakajyosanjimacho 2-chome, Tokushima-shi, Tokushima 770-0813 (JP)

(73) Assignee: Norio Akamatsu, Tokushima (JP)

( * ) Notice: Subject to any disclaimer, the term of this patent is extended or adjusted under 35 U.S.C. 154(b) by 86 days.

(21) Appl. No.: 09/959,972

(22) PCT Filed: Jul. 5, 2001

(86) PCT No.: PCT/JP01/05836

§ 371 (c)(1),
(2), (4) Date: Nov. 14, 2001

(87) PCT Pub. No.: WO02/13367

PCT Pub. Date: Feb. 14, 2002

(65) Prior Publication Data

US 2002/0157701 A1 Oct. 31, 2002

(30) Foreign Application Priority Data

Aug. 7, 2000 (JP) ........................................ 2000-238603

(51) Int. Cl.$^7$ ................................................. H02N 3/00
(52) U.S. Cl. ...................... 136/205; 136/206; 136/215; 136/216; 136/224; 136/246; 136/259; 136/253; 310/300; 310/306; 310/308; 313/523; 313/524; 313/539; 313/542
(58) Field of Search ................................ 136/205, 206, 136/215, 216, 224, 246, 259, 253; 310/300, 306, 308; 313/523, 524, 539, 542

(56) References Cited

U.S. PATENT DOCUMENTS

| 3,358,178 | A |   | 12/1967 | Figner et al. |
| 3,719,856 | A |   | 3/1973  | Koppius |
| 4,007,393 | A |   | 2/1977  | van Stratum et al. |
| 4,168,716 | A | * | 9/1979  | Fowler et al. ............... 136/206 |
| 4,257,823 | A | * | 3/1981  | Bevilacqua et al. ........ 136/206 |
| 5,028,835 | A | * | 7/1991  | Fitzpatrick ................... 313/14 |

FOREIGN PATENT DOCUMENTS

| EP | 989576 A1 * | 3/2000 |
| JP | B1 40-27867 | 12/1965 |
| JP | 4-152229 A * | 5/1992 |
| JP | A 7-177772 | 7/1995 |
| JP | A 7-322659 | 12/1995 |
| JP | A 8-237972 | 9/1996 |
| JP | A 9-107687 | 4/1997 |
| WO | WO-02/13366 A1 * | 2/2002 |
| WO | WO-02/13367 A1 * | 2/2002 |

* cited by examiner

*Primary Examiner*—Alan Diamond
(74) *Attorney, Agent, or Firm*—Oliff & Berridge, PLC

(57) ABSTRACT

The solar energy converter comprises an electron emitter and an electron collector. They are provided separate from each other in a vacuum vessel. Solar energy in a wide range of sunlight spectrum can be efficiently converted into electric energy by moving electrons from the electron emitter to the electron collector.

28 Claims, 22 Drawing Sheets

SOLAR ENERGY CONVERTER

TECHNICAL FIELD

The present invention relates to a solar energy converter for converting solar energy emitted from the sun into electric energy.

BACKGROUND ART

Combustion of fossil fuels such as coal and petroleum for generating energy causes environmental issues worldwide. Further, fossil fuels are a limited natural resource. Thus, it is difficult to rely on fossil fuels as energy sources over the long term.

To resolve impending environmental issues as global warming and acid rain caused by carbon dioxide or nitrogen dioxide, which are generated by fossil fuel combustion, and to do away with apprehension of the imminent exhaustion of fossil fuels, it is necessary to develop a methodology and an apparatus that will efficiently convert solar energy. Development is indispensable for the survival of mankind. If the efficient conversion of solar energy into electric energy can be achieved, mankind can obtain a stable energy supply from the sun. Hence, various techniques relating to solar energy conversion have been diligently developed.

To foremost prerequisite in the methodology and apparatus for converting solar energy into electric energy is that it must be efficient. An associated requirement is that it must avoid using materials which may cause the destruction or deterioration of the environment, to make the best use of cleanliness of solar energy.

Another principal requirement is low cost manufacturing to enable widespread availability. To manufacture at low cost, materials, which are hard to obtain and high in a manufacturing cost, must be avoided. It is also desirable for the structure of the apparatus to be simple.

If the apparatus is simple, it is possible to use the apparatus for a long time with the replacement of the component parts. To use the apparatus for a long time, it is important that the apparatus has durability and a long operation-life. Further, it is desirable that maintenance and operational costs are low.

Further, it is desirable that the apparatus be lightweight and compact for use in many places.

Solar batteries using semiconductors are well-known, as an apparatus for directly converting solar energy into electric energy. In these conventional solar batteries, light wavelengths ranging from 400 nm to 450 nm in the vicinity of blue light are converted into electric energy, that is, only a part of the spectrum of sunlight is used. Namely, it is unattainable to convert all of the visible rays, from green to red, and infrared rays into electric energy in the conventional solar batteries. For this reason, many researchers have devoted themselves to increasing the efficiency of the solar batteries. However, it still remains, at best under 20%.

It is also known that semiconductors, which make up solar batteries, have high manufacturing costs and discharge materials that are environmentally unfriendly during manufacturing.

In the present circumstances, it is impossible to fulfill the above-mentioned requirements with the conventional methodologies and apparatuses.

It is a primary objective of the present invention to provide a solar energy converter which efficiently converts solar energy into electric energy by using a wide range of wavelengths from sunlight spectrum, including also a range of wavelengths which were not used for the conventional solar batteries, which can be manufactured at low cost, and which is environmentally friendly.

DISCLOSURE OF THE INVENTION

To solve the above-mentioned problems, the present invention is for providing a solar energy converter which uses an electron emitter unlike conventional solar batteries (PN connection semiconductor) that utilize only a part of sunlight spectrum.

The electron emitter is an electrode, which emits thermal electrons. In general, an electron emitter is produced by impregnating metals having high electron emission ability such as tungsten, tantalum, scandium, iridium or the like with materials easily emitting thermal electrons such as barium oxide, iridium oxide, strontium carbonate, a compound of iridium or scandium or the like, or by applying the materials on the metals. The electron emitter is a material emitting thermal electrons due to a rise in temperature, such as a carbon compound with a diamond structure, a carbon nanotube or a nitride-boron nanotube. The thermal electrons emitted from the electron emitter are captured and collected by an electron collector, and thereby the solar energy can be converted into electric energy.

An electron emitter was described in U.S. Pat. No. 3,358,178 in 1967, U.S. Pat. No. 3,719,856 in 1973 and U.S. Pat. No. 4,007,393 in 1977. These disclosures made it possible to enhance efficiency of thermal electron emission and improve durability. This kind of technique has been mainly used in the fields of vacuum tubes and CRTs (Cathode Ray Tube).

There is a phenomenon called electric field emission, where a potential barrier on the surface of a solid body, which holds electrons inside the body, becomes lower and thinner if a strong electric field is applied to the surface, and then the electrons are emitted into a vacuum by a tunneling effect.

In particular, if a material having a small radius of curvature is placed in the electric field, electric charges are concentrated on a pointed region with the small radius of curvature, and accordingly it facilitates electron emission. This is the so-called point-concentration phenomenon, and is well known in the field of electric discharge physics.

One characteristic of material with a diamond structure is that electrons can be emitted easily by the effect of negative electron affinity.

Materials such as a needle-shaped carbon, a carbon nanotube and a diamond thin film have been mainly used as an electric field emission material in the fields of vacuum tubes, fluorescent display tubes and electrical field emission displays (CRT, FED, VFD).

The structure of the solar energy converter in the present invention is partly similar to that of vacuum tubes. The functions of vacuum tubes are amplification, rectification and oscillation, while the function of this solar energy converter is electric generation. Consequently, the solar energy converter according to the present invention is completely different from vacuum tubes in respect of function.

Specifically, in accordance with the first aspect of the invention, the solar energy converter comprises:

a light-concentrating device for concentrating sunlight;

a heating plate provided in a vacuum vessel and irradiated with sunlight concentrated by the light-concentrating device;

an electron emitter, which is thermally connected to the heating plate, provided in the vacuum vessel for emitting electrons into a vacuum due to a rise in temperature of the heating plate;

an electron accelerator provided opposite to the electron emitter in the vacuum vessel;

an electron accelerating power source in which its negative terminal is connected to the electron emitter and its positive terminal is connected to the electron accelerator;

an electron deflector provided in the vacuum vessel for deflecting electron beam starting from the electron emitter; and an electron collector for collecting the flying electrons deflected by the electron deflector, wherein the electron collector is regarded as a negative electrode of the electric generator and the electron emitter is regarded as a positive electrode of the electric generator by moving electrons from the electron emitter to the electron collector, and thereby electricity can be generated.

In accordance with the second aspect of the invention, the solar energy converter comprises:

a light-concentrating device for concentrating sunlight;

a heating plate provided in a vacuum vessel and irradiated with sunlight concentrated by the light-concentrating device;

an electron emitter, which is thermally connected to the heating plate, provided in the vacuum vessel for emitting electrons into a vacuum due to a rise in temperature of the heating plate;

an electron accelerator provided opposite to the electron emitter in the vacuum vessel; an electron accelerating power source in which its negative terminal is connected to the electron emitter and its positive terminal is connected to the electron accelerator;

a first slit-type electron collector provided between the electron emitter and the electron accelerator for collecting flying electrons emitted from the electron emitter;

a second slit-type electron collector provided between the first slit-type electron collector and the electron accelerator in such a manner that the electric lines of force starting from the electron accelerator could pass through its slits; and an electron deflector provided in the vacuum vessel for deflecting electron beam which passes through the slits of the first slit-type electron collector in such a manner that the second slit-type electron collector can capture and collect the flying electrons, wherein the electron collector is regarded as a negative electrode of the electric generator and the electron emitter is regarded as a positive electrode of the electric generator by moving electrons from the electron emitter to the electron collector, and thereby electricity can be generated.

Further, in the solar energy converter according to the present invention, the electron deflector may comprise either a magnetic deflector or an electrostatic deflector.

Still further, in the solar energy converter according to the present invention, a surface of the electron collector may comprise metallic fibers or mesh-shaped or grid-shaped metal wires for capturing and collecting the flying electrons effectively.

In accordance with the third aspect of the invention, the solar energy converter comprises:

a light-concentrating device for concentrating sunlight;

a heating plate provided in a vacuum vessel and irradiated with sunlight concentrated by the light-concentrating device;

an electron emitter, which is thermally connected to the heating plate, provided in the vacuum vessel for emitting electrons into a vacuum due to a rise in temperature of the heating plate;

an electron accelerator provided opposite to the electron emitter in the vacuum vessel;

an electron accelerating power source in which its negative terminal is connected to the electron emitter and its positive terminal is connected to the electron accelerator; and an electron collector provided between the electron emitter and the electron accelerator for collecting flying electrons emitted from the electron emitter, wherein the electron collector comprises metallic fibers or mesh-shaped or grid-shaped metal wires, and the electron collector is regarded as a negative electrode of the electric generator and the electron emitter is regarded as a positive electrode of the electric generator by moving electrons from the electron emitter to the electron collector, and thereby electricity can be generated.

In accordance with the fourth aspect of the invention, the solar energy converter comprises:

a light-concentrating device for concentrating sunlight;

a heating plate provided in a vacuum vessel and irradiated with sunlight concentrated by the light-concentrating device;

an electron emitter, which is thermally connected to the heating plate, provided in the vacuum vessel for emitting electrons into a vacuum due to a rise in temperature of the heating plate;

an electron accelerator provided opposite to the electron emitter in the vacuum vessel;

an electron accelerating power source in which its negative terminal is connected to the electron emitter and its positive terminal is connected to the electron accelerator; and an electron collector provided between the electron emitter and the electron accelerator for collecting flying electrons emitted from the electron emitter, wherein the electron accelerator and the electron collector are electrically insulated from each other, and the electron collector is regarded as a negative electrode of the electric generator and the electron emitter is regarded as a positive electrode of the electric generator by moving electrons from the electron emitter to the electron collector, and thereby electricity can be generated.

In the solar energy converter according to the present invention, the electron emitter may contain or may be coated with a compound which comprises at least one selected from the group consisting of iridium, scandium, barium and carbon.

In the solar energy converter according to the present invention, the electron collector may comprise one selected from the group consisting of stainless, molybdenum compound, tungsten compound and the like.

In the solar energy converter according to the present invention, at least one of two things may be processed to be a blackbody: the heating plate and the electron emitter.

In the solar energy converter according to the present invention, the electron collector may include an electron-leakage preventing member to prevent the electrons from being reflected from the collector after collision against the electron collector.

In the solar energy converter according to the present invention, the electron collector may be curved in such a manner that the center of its curvature is located on the side of the electron emitter.

In the solar energy converter according to the present invention, a sunlight penetration window may be formed in a partial region of the vacuum vessel to allow sunlight concentrated by the light-concentrating device to pass through the vacuum vessel.

In the solar energy converter according to the present invention, the heating plate may be fixed to the vacuum vessel by means of a fixing member made of a non-thermally conductive material.

In the solar energy converter according to the present invention, an insulator may be sandwich between the heating plate and the electron emitter disposed in the vacuum vessel.

In accordance with the fifth aspect of the invention, the solar energy converter comprises:

a cathode and an anode provided opposite to each other in a vacuum vessel;

an electric field generating power source provided for generating an electric field between the cathode and the anode by connecting its negative terminal to the cathode and its positive terminal to the anode;

an electron emitter capable of passing through the electric field, provided between the cathode and the anode in the vacuum vessel, for emitting electrons into a vacuum due to sunlight heat; and an electron collector capable of passing through the electric field, provided between the electron emitter and the anode in the vacuum vessel, for collecting the electrons emitted from the electron emitter, wherein the electron collector is regarded as a negative electrode of the electric generator and the electron emitter is regarded as a positive electrode of the electric generator by moving electrons from the electron emitter to the electron collector, and thereby electricity can be generated.

In accordance with the sixth aspect of the invention, the solar energy converter comprises:

a cathode and an anode provided opposite to each other in a vacuum vessel;

an electric-field generating power source provided for generating an electric field between the cathode and the anode by connecting its negative terminal to the cathode and its positive terminal to the anode;

an electron emitter capable of passing through the electric field, provided between the cathode and the anode in the vacuum vessel, for emitting electrons into a vacuum due to sunlight heat;

a first slit-type electron collector provided between the electron emitter and the electron accelerator for collecting flying electrons emitted from the electron emitter;

a second slit-type electron collector provided between the first slit-type electron collector and the electron accelerator in such a manner that the electric lines of force starting from the electron accelerator could pass through its slits; and an electron deflector provided in the vacuum vessel for deflecting electron beam having passed through the slits of the first slit-type electron collector to allow the second slit-type electron collector to collect the flying electrons, wherein the electron collector is regarded as a negative electrode of the electric generator and the electron emitter is regarded as a positive electrode of the electric generator by moving electrons from the electron emitter to the electron collector, and thereby electricity can be generated.

In accordance with the seventh aspect of the invention, the solar energy converter comprises:

a cathode and an anode provided opposite to each other in a vacuum vessel;

an electric field generating power source provided for generating an electric field between the cathode and the anode by connecting its negative terminal to the cathode and its positive terminal to the anode;

an electron emitter capable of passing through the electric field, provided between the cathode and the anode in the vacuum vessel, for emitting electrons into a vacuum owing to a rise of temperature;

an electron deflector provided in the vacuum vessel for deflecting electron beam starting from the electron emitter; and an electron collector provided for collecting electron beam which is deflected by the electron deflector, wherein the electron collector is regarded as a negative electrode of the electric generator and the electron emitter is regarded as a positive electrode of the electric generator by moving electrons from the electron emitter to the electron collector, and thereby electricity can be generated.

In the solar energy converter according to the present invention, an insulator may be provided on the anode side of the electron collector.

In the solar energy converter according to the present invention, a sunlight penetration window for sunlight passing through the vacuum vessel may be formed in a partial region of the vacuum vessel in such a manner that the electron emitter can be irradiated with sunlight.

Further, the solar energy converter according to the present invention may be also provided with a light-concentrating device for concentrating sunlight in such a manner that the electron emitter can be irradiated with sunlight concentrated by the light-concentrating device.

Still further, in the solar energy converter according to the present invention, the light-concentrating device may be provided with either a lens or a concave mirror.

In the solar energy converter according to the present invention, at least the electron emitter out of the electron emitter and the electron collector may comprise a material containing carbon compound.

In the solar energy converter according to the present invention, at least the electron emitter out of the electron emitter and the electron collector may comprise a material having a diamond structure.

In the solar energy converter according to the present invention, at least the electron emitter out of the electron emitter and the electron collector may comprise a carbon nanotube.

In the solar energy converter according to the present invention, either the electron emitter or the electron collector may be provided with a fiber-shaped, or mesh-shaped, or grid-shaped conductive member.

In the solar energy converter according to the present invention, the electron emitter may comprise one selected from the group consisting of a material made of carbon, a material having a diamond structure and a carbon nanotube, and the electron collector may comprise one selected from the group consisting of a material made of carbon, a material having a diamond structure and a carbon nanotube, and these materials may be combined in the electron emitter and electron collector.

In the solar energy converter according to the present invention, the electron collector may comprise one selected from the group consisting of stainless, molybdenum compound and tungsten compound.

In the solar energy converter according to the present invention, the electron deflector may comprise either a magnetic deflector or an elector-static deflector.

PREFERRED EMBODIMENT OF THE INVENTION

Figure 1:
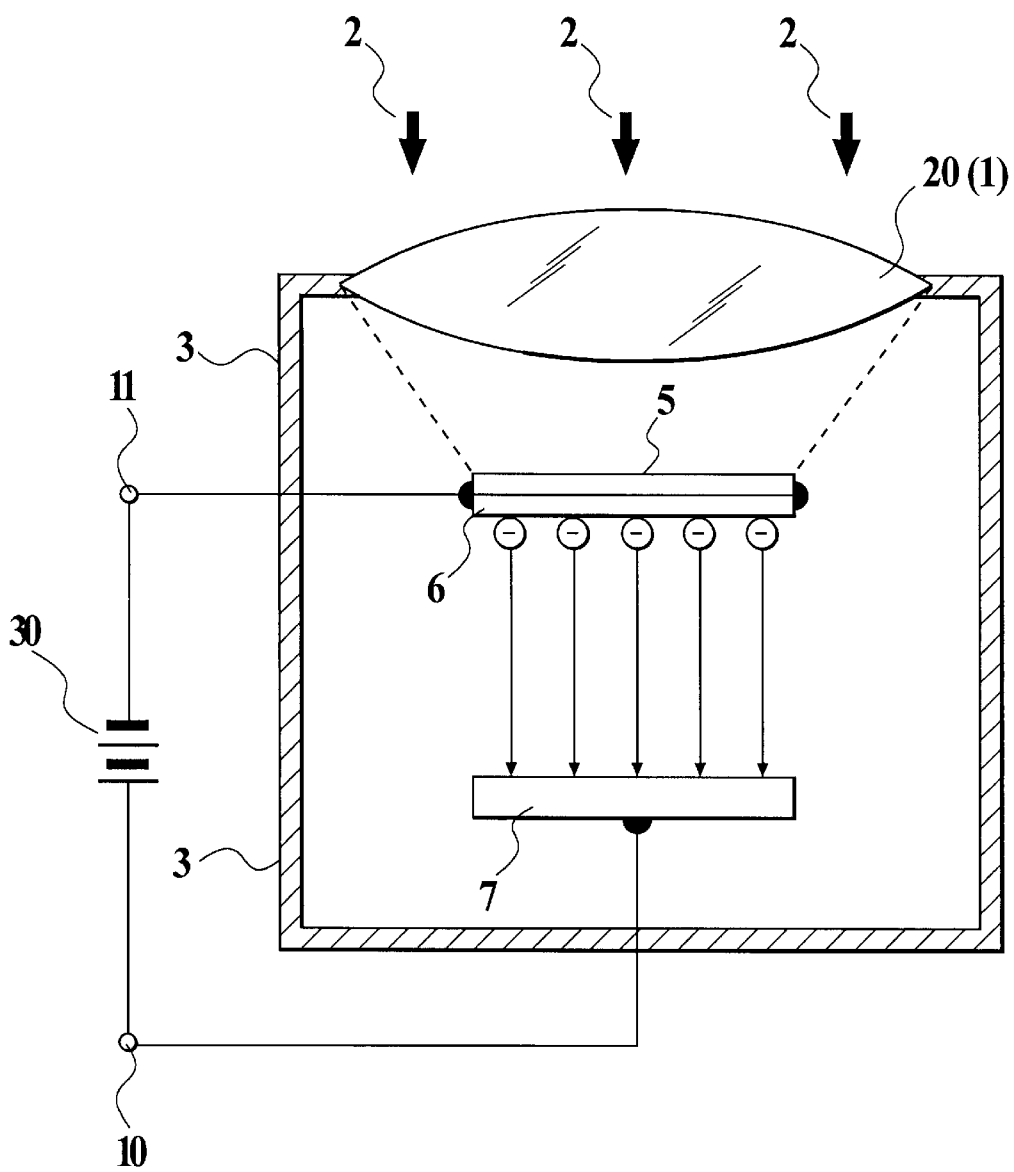
FIG. 1 is a side view showing the fundamental structure, i.e., the internal structure of the sectional vacuum vessel, of the solar energy converter of the present invention.

FIG. 1 shows the fundamental structure of a solar energy converter 100, which is an apparatus for converting sunlight energy into electric energy. This figure is used to explain the fundamental behavior of the solar energy converter. Since FIG. 1 purpose is to show only a fundamental structure, the solar energy converter 100 in FIG. 1 is slightly different from a practical solar energy converter.

As shown in FIG. 1, the solar energy converter 100 comprises a vacuum vessel 3, a convex lens 20 provided in the vacuum vessel 3, a heating plate 5 disposed in the vacuum vessel 3, an electron emitter 6 thermo-conductively connected to the heating plate 5, an electron accelerator 7, an electron accelerating power source 30 connected to the electron emitter 6 and the electron accelerator 7. The electron emitter 6 is an electrode that emits electrons. In general, this type of electrode emits thermal electrons by applying materials easily emitting thermal electrons, and by raising the temperature. The electrode, which corresponds to a cathode in the Edison effect discovered by T. A. Edison in 1883, is called an electron emitter. The electron accelerator 7 is disposed for accelerating the emitted electrons. That is, a positive voltage is applied to the electron accelerator 7 in such a manner that the emitted electrons emit from the electron emitter 6 into a vacuum the flying electrons are accelerated by the applied. The emitted electron is an electron that is emitted from a negative electrode by the voltage applied to a positive electrode when a material with high electron emission ability such as tungsten, tantalum, barium oxide, iridium oxide, strontium carbonate, compound of iridium, scandium, nitride-boron nanotube or a carbon nanotube is used as the negative electrode with a high temperature in a vacuum.

The inside of the vacuum vessel 3 is extremely evacuated, and the electron emitter 6 and the electron accelerator 7 are disposed opposite to each other, so that the electrostatic field is formed between the two electrodes.

A convex lens 20 or a concave mirror 21 is used as a light-concentrating device 1, which is a device for concentrating sunlight 2 on a narrow region. When the heating plate 5 is placed in the neighborhood of the focal point of the convex lens 20, the temperature of the heating plate 5 is raised by solar energy, and the temperature of the electron emitter 6, which is thermo-conductively connected to the heating plate 5, is raised by a rise in temperature of the heating plate 5. Since the inside of the vacuum vessel 3 is evacuated, the concentrated heat energy is scarcely dissipated by thermal conduction. Therefore, the highly efficient conversion of solar energy into electric energy can be achieved. Further, since the sunlight direction varies as a function of time, an optical sensor (not illustrated) may be used for detecting the sunlight direction, and a driving apparatus (not illustrated) may be used for making the light-concentrating device 1 trace the sunlight. This sophisticated system can improve the efficiency in converting solar energy into electric energy.

The electron emitter 6, which is impregnated with a barium or scandium compound, emits thermal electrons into a vacuum by a rise in temperature. In particular, if the heating plate 5 and the electron emitter 6 are processed to be a blackbody by coating black materials on their surface, almost all solar energy incident on the black-bodies is absorbed by the black portions owing to the effect of blackbody absorption. As a result, the temperature of the heating plate 5 and electron emitter 6 can be raised. The more the temperature is raised in the electron emitter 6, the more thermal electrons are emitted from the electron emitter 6, although the emitted emission is limited in the saturation region. Consequently, the efficiency in converting solar energy into electric energy is improved by using the high emission materials for the electron emitter.

To convert solar energy into electric energy by capturing the flying electrons, the electron accelerator 7 and the electron collector 8 must be designed to be completely separate from each other. Otherwise, the positive terminal 10 of an electron accelerating power source 30, a direct current power source, is connected to the electron accelerator 7 and its negative terminal 11 is connected to the electron emitter 6, the emitted electrons are accelerated by the effect of the electrostatic field between the electron emitter 6 and the electron accelerator 7. The accelerated electrons fly toward the electron accelerator 7 along the electric flux lines, and finally collide against the electron accelerator 7. The flying electrons are captured after collision against the electron accelerator 7 and neutralized by the electron accelerating power source 30. Therefore, the solar system shown in FIG. 1 cannot generate usable electric energy.

Figure 3:
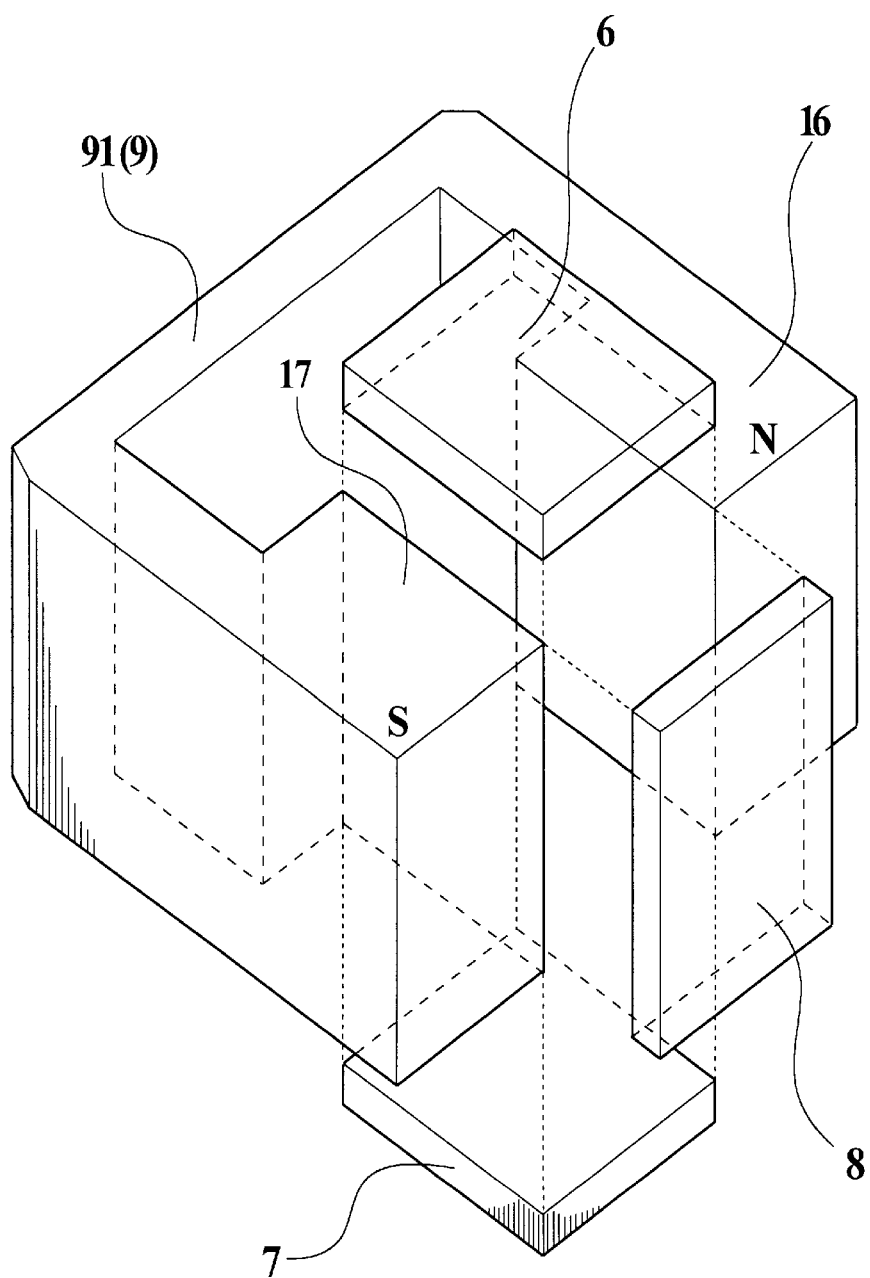
FIG. 3 is an oblique view showing the position of magnet of the solar energy converter to which a magnetic deflection method is applied.
Figure 4:
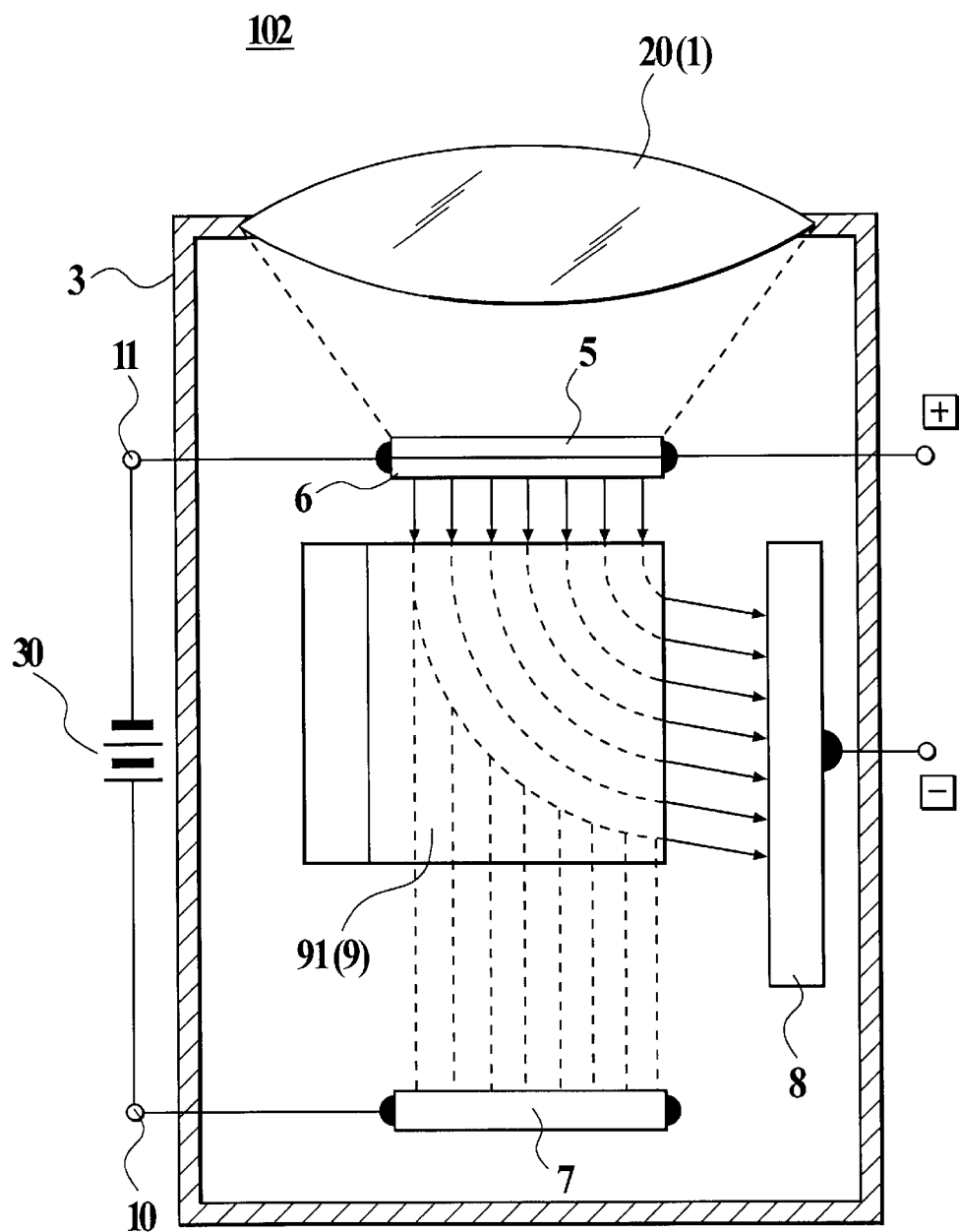
FIG. 4 is a side view showing the internal structure of the sectional vacuum vessel in the solar energy converter to which a magnetic deflection method is applied.

Hence, in the present invention, an electron collector 8 is disposed separately from the electron accelerator 7 for collecting electrons, and an electron deflector 9 is provided for deflecting the electron beam to prevent the flying electrons from reaching the electron accelerator 7. By applying this mechanism, the deflected electrons collide against the electron collector 8. In the above-mentioned solar energy system, the electron collector 8 collects the flying electrons, and solar energy can be efficiently converted into electric energy. The structure of such a solar energy converter is shown in FIGS. 2 to 4.

In the solar energy converter shown in these figures, the electron collector 8 is an electrode for capturing the flying electrons emitted from the electron emitter 6. In general, the electron collector 8 is made of such materials as stainless steel, or molybdenum or tungsten compound. However, other conductive metals can be substituted for the material. In particular, a hard metal such as molybdenum, titanium, tungsten or stainless steel is suitable for the electron collector 8.

The electron deflector 9 is a device for deflecting the electron beam emitted from the electron emitter into a vacuum. There are two types of method in the electron deflector 9, that are, an electrostatic deflection and a magnetic deflection. The electrostatic deflection consists of one pair of electrodes, i.e., a positive electrostatic deflecting electrode to which positive voltage is applied and a negative electrostatic deflecting electrode to which negative voltage is applied. The electron beam travels between the positive and negative deflectors, so that the Coulomb force deflects the electron beam. The magnetic deflection is a method wherein the North and South Poles of a magnet are disposed in the vicinity of the orbits of flying electrons to deflect the electron beam by using the Lorentz force working on the moving electrons in a magnetic field generated by the magnet.

Figure 2:
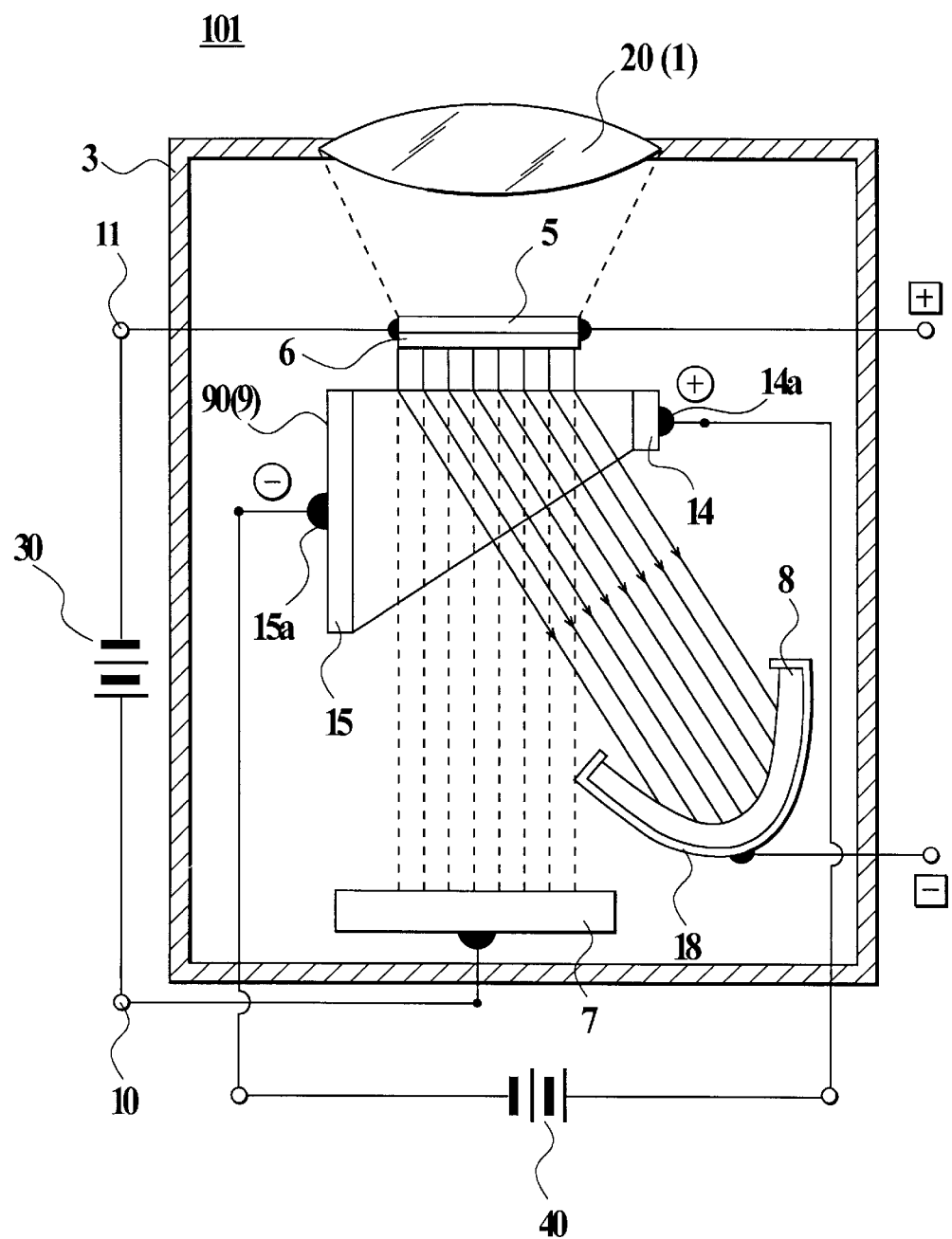
FIG. 2 is a side view showing the internal structure of the sectional vacuum vessel in the solar energy converter to which an electrostatic deflection method is applied.

Turning to FIG. 2, a solar energy converter 101 employing the electrostatic deflection method is shown. In the solar energy converter 101, the electron collector 8 and an electrostatic deflector 90 used as an electron defector 9 are added to the fundamental structure of the solar energy converter 100 shown in FIG. 1. The electrostatic deflector 90 comprises a positive terminal 14a of an deflecting positive electrode 14, a negative terminal 15a of an electrostatic deflecting negative electrode 15 and an electrostatic deflecting power source 40.

In the solar energy converter 101 shown in FIG. 2, a convex lens 20 is used as the light-concentrating device 1 for concentrating sunlight 2, the heating plate 5 is disposed in the neighborhood of the focal point of the convex lens 20 so as to rise the temperature of the heating plate 5 by sunlight irradiation, and then the temperature of the electron emitter 6 is raised by a rise in temperature of the heating plate 5 which is thermo-conductively connected to the electron emitter 6, just like the solar energy converter 100 shown in FIG. 1. Rise in temperature of the electron emitter 6 causes the electron emitter 6 to emit thermal electrons into a vacuum. The emitted electrons are accelerated by positive voltage applied to the electron accelerator 7 from the electron accelerating power source 30, and attracted by the electron accelerator 7.

The emitted electrons travel between the electrostatic deflecting positive electrode 14 and negative electrode 15 of the electrostatic deflector 90. An electrostatic field generated by the electrostatic deflector 90 deflects the electron beam. Namely, the emitted electrons are accelerated and attracted toward the electron accelerator 7 at an early flying stage. However, when the emitted electrons travel between the positive terminal 14a of the electrostatic deflecting positive electrode 14 and the negative terminal 15a of the electrostatic deflecting negative electrode 15, the electrons are affected by repulsive force from the negative terminal 15a of the electrostatic deflecting negative electrode 15, and by attractive force from the positive terminal 14a of the electrostatic deflecting positive electrode 14. As a result, the emitted electrons travel in the deflected direction shown by the solid lines in FIG. 2 and eventually reach the electron collector 8 disposed in the traveling direction of the electrons.

As a result of the above-described phenomenon, the electron collector 8 receives excessive electrons, and it is negatively charged. The electron collector 8 results in the same state as a negative electrode of a battery. On the other hand, the electron emitter 6 becomes short of electrons owing to electron emission, and it is positively charged. The electron emitter 6 results in the same state as a positive electrode of a battery. If an electric load, such as a resistor or capacitor, were connected to the electron emitter 6 and the electron collector 8, an electric current would flow in the electric load. As a result, solar energy can be converted into electric energy.

Electric power consumption in the electron accelerating power source 30 is described below. To accelerate emitted electrons, it is necessary to apply positive voltage to the electron accelerator 7. For this reason, the electron accelerating power source 30 is required. Since the electron accelerator 7 is only used for accelerating the emitted electrons, they do not collide against the electron accelerator 7. Namely, the electron accelerating power source 30, which is a power source for accelerating the electrons, only exerts the Coulomb force on the flying electrons. Therefore, electric current supplied from the electron accelerating power source 30 is approximately zero. Consequently, the electric power consumption in the electron accelerating power source 30 is approximately zero.

Electric power consumption of the electrostatic deflector 90 is described below. To perform electrostatic deflection, it is necessary to apply voltage on the electrostatic deflecting positive electrode 14 and negative electrode 15. Therefore, the electrostatic deflecting power source 40 is required. Since the electrostatic deflecting positive electrode 14 and negative electrode 15 are used for deflecting the electron beam, the electrons do not collide against the electrostatic deflecting positive electrode 14. Namely, the electrostatic deflecting power source 40, which is a power source for deflecting the electron beam, only exerts the Coulomb force on the emitted electrons. Therefore, the electric current supplied from the electrostatic deflecting power source 40 is approximately zero. Consequently, the electric power consumption in the electrostatic deflecting power source 40 is approximately zero.

As described above, since the electric power consumption of the electron accelerating power source 30 and the electrostatic deflecting power source 40 is approximately zero, the total electric power consumption for generating electricity results in approximately zero. Therefore, the solar energy converter 101 has high efficiency and a significant practical use in converting solar energy into electric energy.

The solar energy converter 102 employing a magnetic deflection method is described below.

FIG. 3 shows a solar energy converter using the magnetic deflection method and the positional relationship among a magnetic deflector 91, an electron emitter 6, an electron accelerator 7 and an electron collector 8. FIG. 4 shows a solar energy converter employing the magnetic deflection method. In the solar energy converter, an electron collector 8 and a magnetic deflector 91 used as an electron deflector 9 are added to the fundamental structure of the solar energy converter 100 shown in FIG. 1. FIG. 4 is a side view from the South Pole 17 of the magnetic deflector 91 shown in FIG. 3.

As shown in FIG. 4, in the solar energy converter 102 employing the magnetic defection method, the convex lens 20 is used as the light-concentrating device 1 for concentrating sunlight 2, the heating plate 5 is disposed in the neighborhood of the focal point of the convex lens 20 so as to raise the temperature of the heating plate 5 by sunlight irradiation, and then the temperature of the electron emitter 6 is raised by the heating plate 5 which is thermo-conductively connected to the electron emitter 6, just like the solar energy converter 100 shown in FIG. 1. Rising in temperature of the electron emitter 6 causes the electron emitter 6 to emit thermal electrons into a vacuum. The emitted electrons are accelerated by positive voltage applied to the electron accelerator 7 from the electron accelerating power source 30, and attracted by the electron accelerator 7.

When the electron beam travels between the North and South Poles of the magnetic deflector 91, it is deflected by the effect of the magnetic deflector 91. Namely, the flying electrons emitted from the electron emitter 6 are accelerated by the electron accelerator 7, and travel in the direction of the electron accelerator 7 at an early flying stage. However, when the emitted electrons pass through the magnetic field formed by the North Pole 16 and South Pole 17 of the magnetic deflector 91, the electron beam is deflected by the Lorentz force in the direction of the electron collector 8, in accordance with Fleming's Left Hand Rule. Namely, the electron beam is deflected along the curve shown by broken lines in FIG. 4. Since the electron beam is deflected in the direction of the electron collector 8, almost all the emitted electrons eventually reach the electron collector 8.

As a result of the above-described phenomenon, the electron collector 8 receives excessive electron, and is negatively charged. The electron collector 8 results in the same state as a negative electrode of a battery. On the other hand, the electron emitter 6 becomes short of electrons owing to the electron emission, and is positively charged. The electron emitter 6 results in the same state as a positive electrode of a battery. If an electric load, such as a resistor or a capacitor, were connected to the electron emitter 6 and the electron collector 8, an electric current would flow in the electric load. As a result, solar energy can be converted into electric energy.

In this case, the electric power consumption in the electron accelerator 7 is approximately zero as described above. In addition, the magnetic deflector 91 is a permanent magnet, which does not require a power source in performing the magnetic deflection. Therefore, the electric power consumption in the magnetic deflector 91 is approximately zero.

As described above, the electric power consumption of the electron accelerating power source 30 and of the magnetic deflector 91 is approximately zero. Therefore, the total electric power consumption for generating electricity results in approximately zero. Consequently, the solar energy converter 101 has high efficiency and has a significant practical use in converting solar energy into electric energy.

The electrostatic deflection method has the same structure as the magnetic deflection method in the solar energy converter of the present invention, except for the electrostatic deflector 90 and the magnetic deflector 91.

The efficiency of the electron collector 8 in capturing the emitted electrons is described below.

As shown in FIG. 2, the electron collector 8 has a curved surface like a concave and the surface is oriented to the electron emitter 6. Further, the electron collector 8 is provided with an electron-leakage preventing member 18 for preventing the collected electrons from leaking out to the electron accelerator 7.

However, in such a shape of the electron collector 8 as shown in FIG. 4, there is a possibility that the collected electrons leak out to the electron accelerator 7. Even if a small amount of electrons reach the electron accelerator 7, the electric charge available in the electron collector 8 decreases, and electric current supplied from an external power source to the electron accelerator 7 increases. As a result, the power consumption in the solar energy system increases, and the efficiency in converting solar energy into electric energy lowers.

Figure 5:
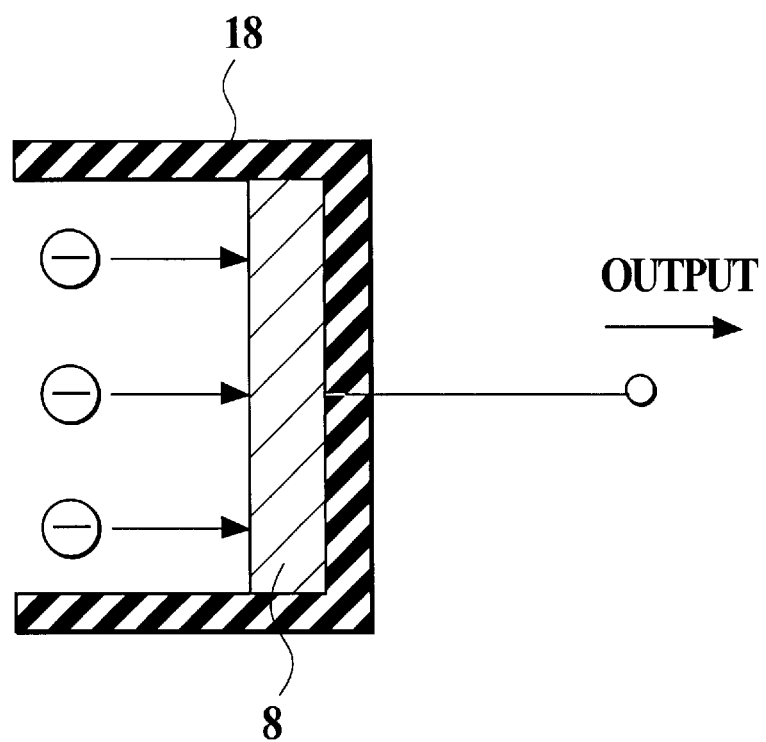
FIG. 5 is a cross-sectional view showing an electron collector in which an electron-leakage preventing member is installed.

To solve the electron-leakage problem, the electron collector 8, as shown in FIG. 5, is provided with an electron-leakage preventing member 18, which is almost U-shaped for preventing the collected electrons from leaking out to the electron accelerator 7. The phenomenon that the amount of electric current available in the electron collector 8 decreases can be avoided, and unnecessary electric current supplied from an external power source to the electron accelerator 7 is not required. As a result, the efficiency in converting solar energy into electric energy increases.

Figure 6:
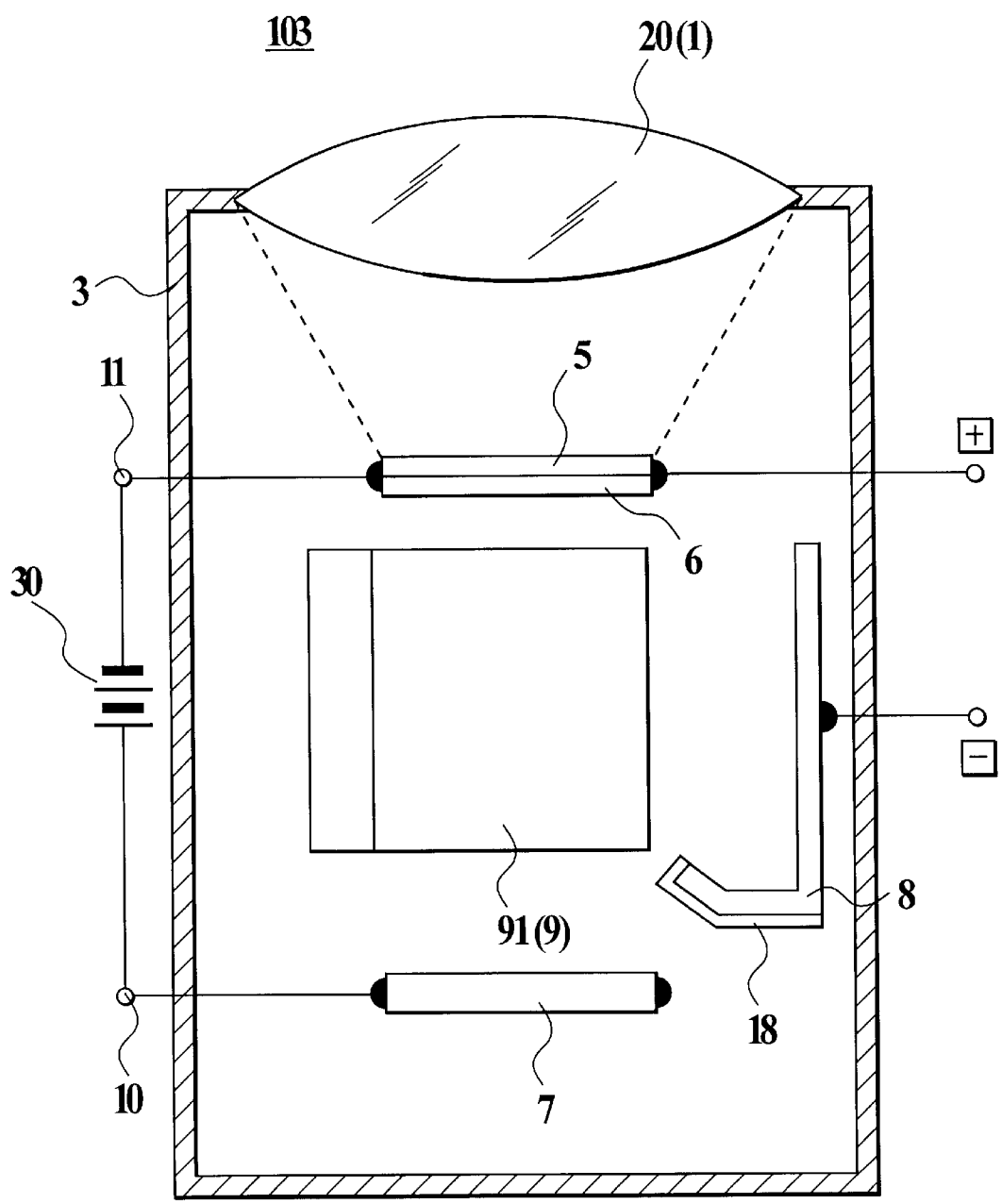
FIG. 6 is a side view showing the internal structure of the sectional vacuum vessel in the solar energy converter to which a magnetic deflection method is applied and in which an electron-leakage prevention member curving toward the electron emitter is installed in the electron collector.

Another embodiment for preventing the collected electrons from leaking out to the electron accelerator 7 is shown in FIG. 6. As shown in FIG. 6, in a solar energy converter 103, an electron collector 8 is provided with a portion oriented to the electron emitter 6 instead of the curved surface shown in FIG. 2. This structure makes it possible to prevent the collected electrons from leaking out to the electron accelerator 7. Moreover, since an electron-leakage preventing member 18 made of insulating material is disposed between the electron collector 8 and the electron accelerator 7, the electron-leakage from the electron collector 8 into the electron accelerator 7 can be prevented more effectively. Owing to the effect of the electron-leakage preventing member 18, the power consumption in the solar system decreases, and the electric energy available in the electron collector 8 increases, and thereby the efficiency in converting solar energy into electric energy can be improved. Hence, such a solar energy converter can be practically used.

The solar energy converter, in which an electron collector 8 is disposed between an electron emitter 6 and an electron accelerator 7, is described below.

Figure 7:
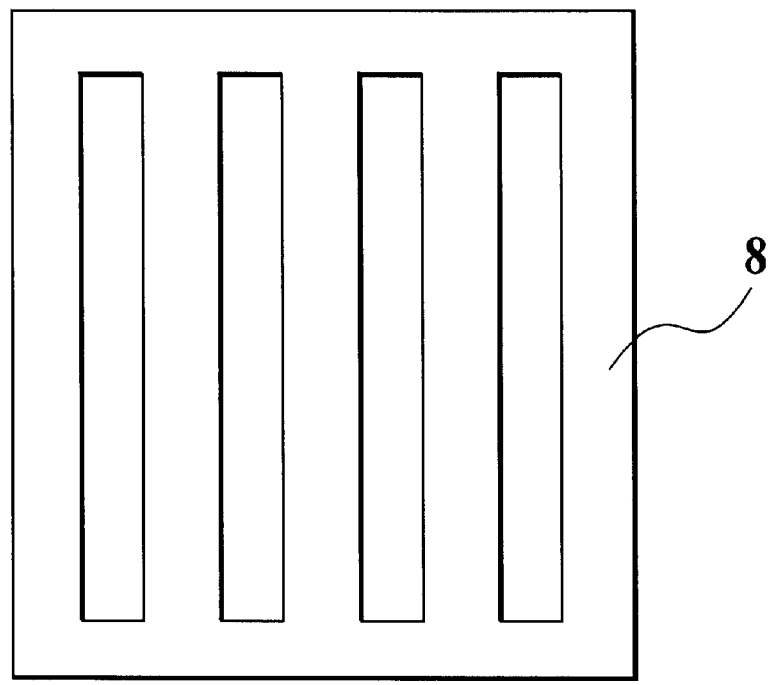
FIG. 7 is a plane view showing a slit-type electron collector.

FIG. 7 shows a slit-type electron collector 8 which is disposed between the electron emitter 6 and the electron accelerator 7.

Figure 8:
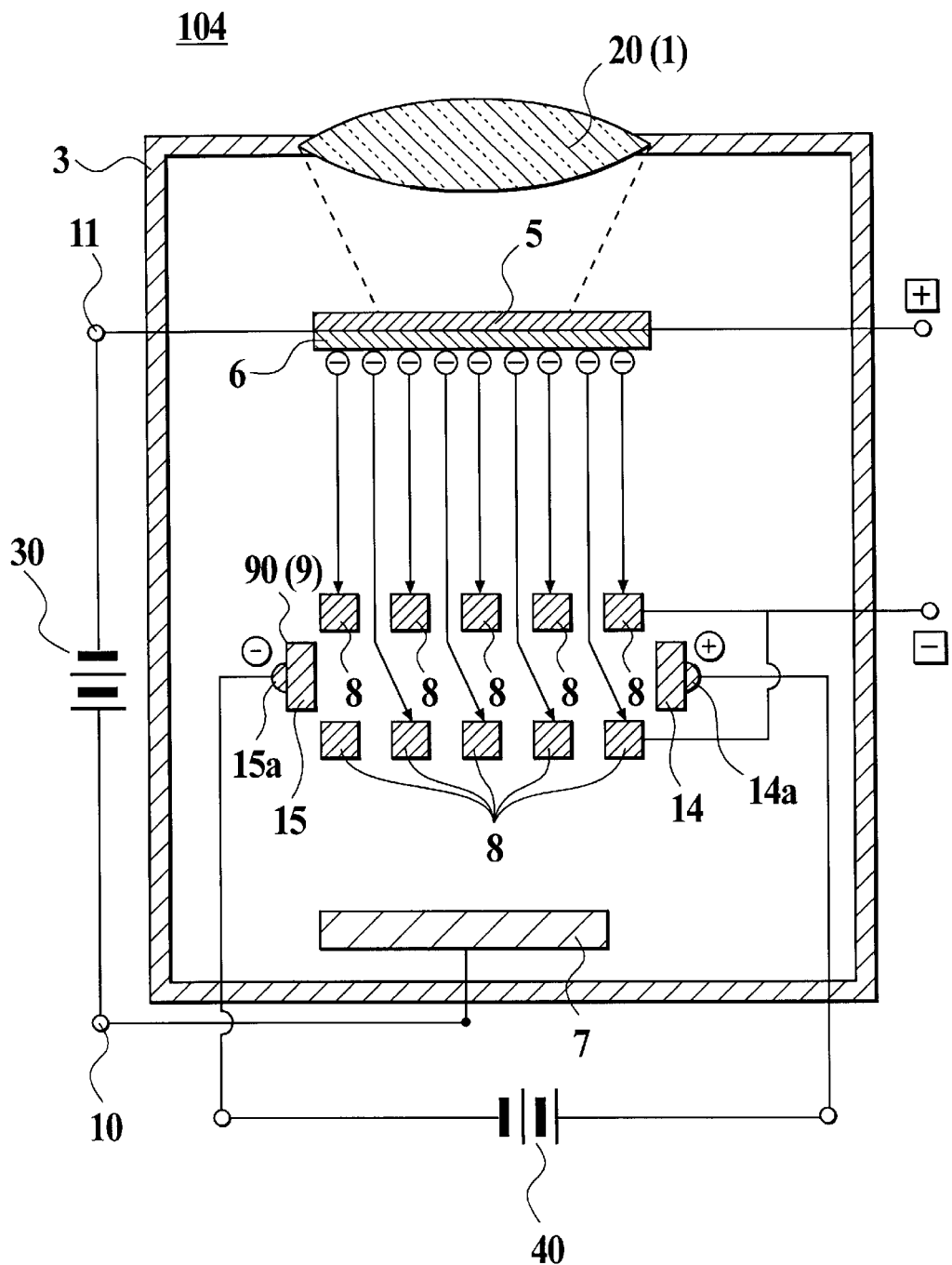
FIG. 8 is a perpendicular cross-sectional view to a slit-type electron collector of the solar energy converter using a slit-type electron collector.

FIG. 8 shows a solar energy converter 104 wherein two sheets of the slit-type electron collectors 8 are disposed between the electron emitter 6 and the electron accelerator 7. In this case, one of the two slit-type electron collectors 8 which is disposed on the side of the electron emitter 6 is the first slit-type electron collector 8, and the other of the two slit-type electron collector 8 which is disposed on the side of the electron accelerator 7 is the second slit-type electron collector 8.

The two slit-type electron collectors 8 are disposed opposite to each other in such a manner that electric lines of force could pass through the slits. In this manner, the slit-type electron collectors 8 do not obstruct the electric lines of force starting from the electron accelerator 7. Therefore, the emitted electrons fly from the electron emitter 6 to electron accelerator 7, just like the solar energy converters described above.

The slits of the two slit-type electron collectors 8 are not necessarily required to have the same width and size or to completely correspond to each other. The only requirement for positioning the slits is that they do not obstruct the electric lines of force.

The emitted electrons which collide against the first slit-type electron collector 8 are absorbed therein, and the flying electrons which pass through the first slit-type electron collector 8 are deflected owing to the effect of the electric field caused between the positive electrode 14 and the negative electrode 15. The deflected flying electrons eventually collide against the second slit-type electron collector 8, and are absorbed therein.

As a result of the above-described phenomenon, the electron collector 8 receives excess electrons, and is negatively charged. The electron collector 8 results in the same state as a negative electrode of a battery. On the other hand, the electron emitter 6 becomes short of electrons due to emission, and is positively charged. The electron collector 8 results in the same state as a positive electrode of a battery.

In this state, an electric load, such as a resistor or capacitor, is connected to the electron emitter 6 and the electron collector 8, and thereby electricity can be generated. As a result, solar energy can be efficiently converted into electric energy.

In comparison with the solar energy converter 101 previously described, the solar energy converter 104 having the structure requires less amount of deflection for the emitted electrons. Therefore, the smaller voltage applied from the electrostatic deflecting power source 40 would be necessary.

The electrostatic deflector 90 is used as the electron deflector 9 in the embodiment described above. However, a magnetic deflector 91 can be substituted for the electrostatic deflector 90.

An embodiment of an electron-leakage preventing method, in which an electron collector 8 is structurally modified, is described below.

A metal plate-shaped electrode, which has a rigid surface, is used as the electron collector 8. However, when the flying electrons collide against the electrode, they may be reflected by the rigid surface. To avoid this matter, the electron collector 8 is formed into a hook-shape, or provided with the electron-leakage preventing member 18 made of insulating material. These two formations make it possible to minimize the electron leakage.

Figure 9:
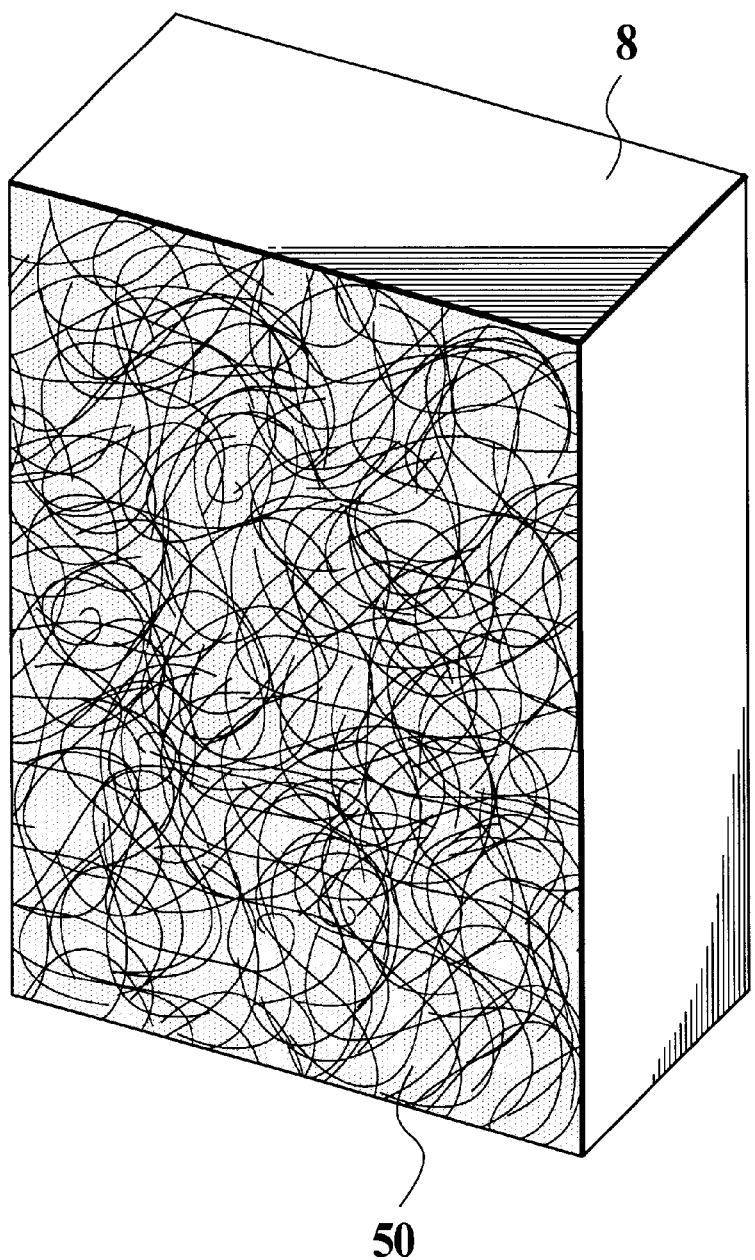
FIG. 9 is a perspective view showing an example of an electron collector using metallic fibers.
Figure 10:
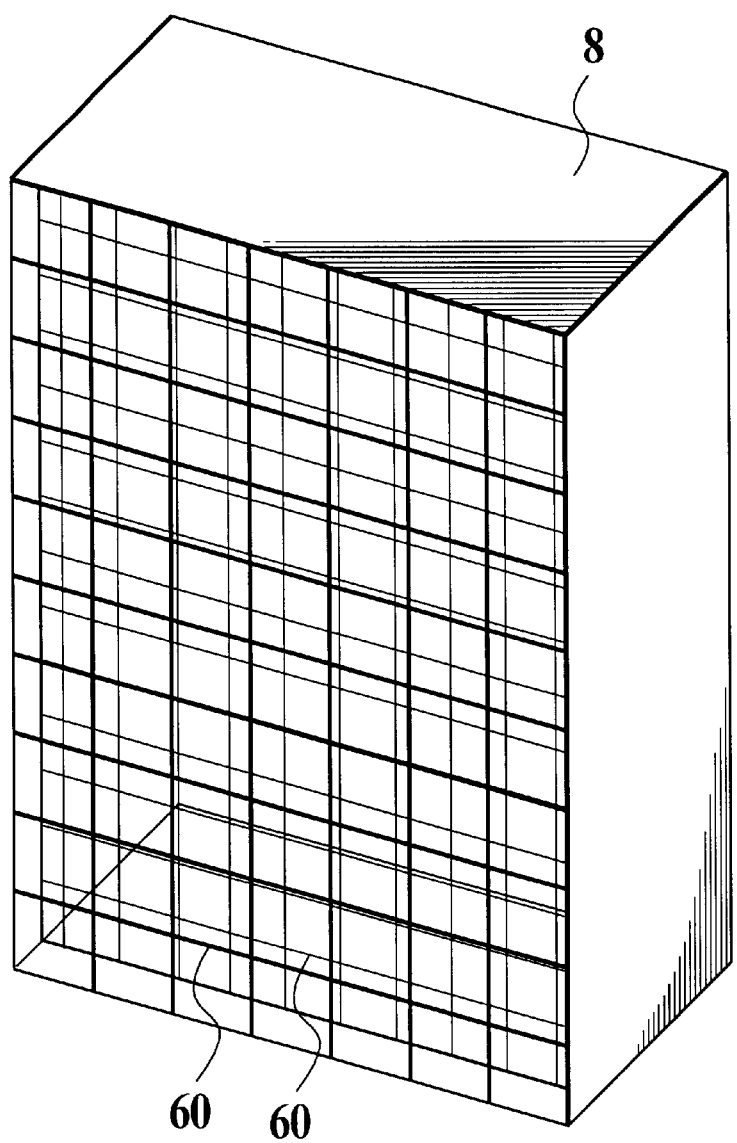
FIG. 10 is a perspective view showing an example of an electron collector using metal meshes.

Further, as shown in FIGS. 9 and 10, the electron leakage can be also minimized by using metallic fibers 50 which are formed by making a fine metal material for the electrode into fibers, or by using an electrode which is formed by putting metal meshes 60 made of metal wires in layers.

Figure 11:
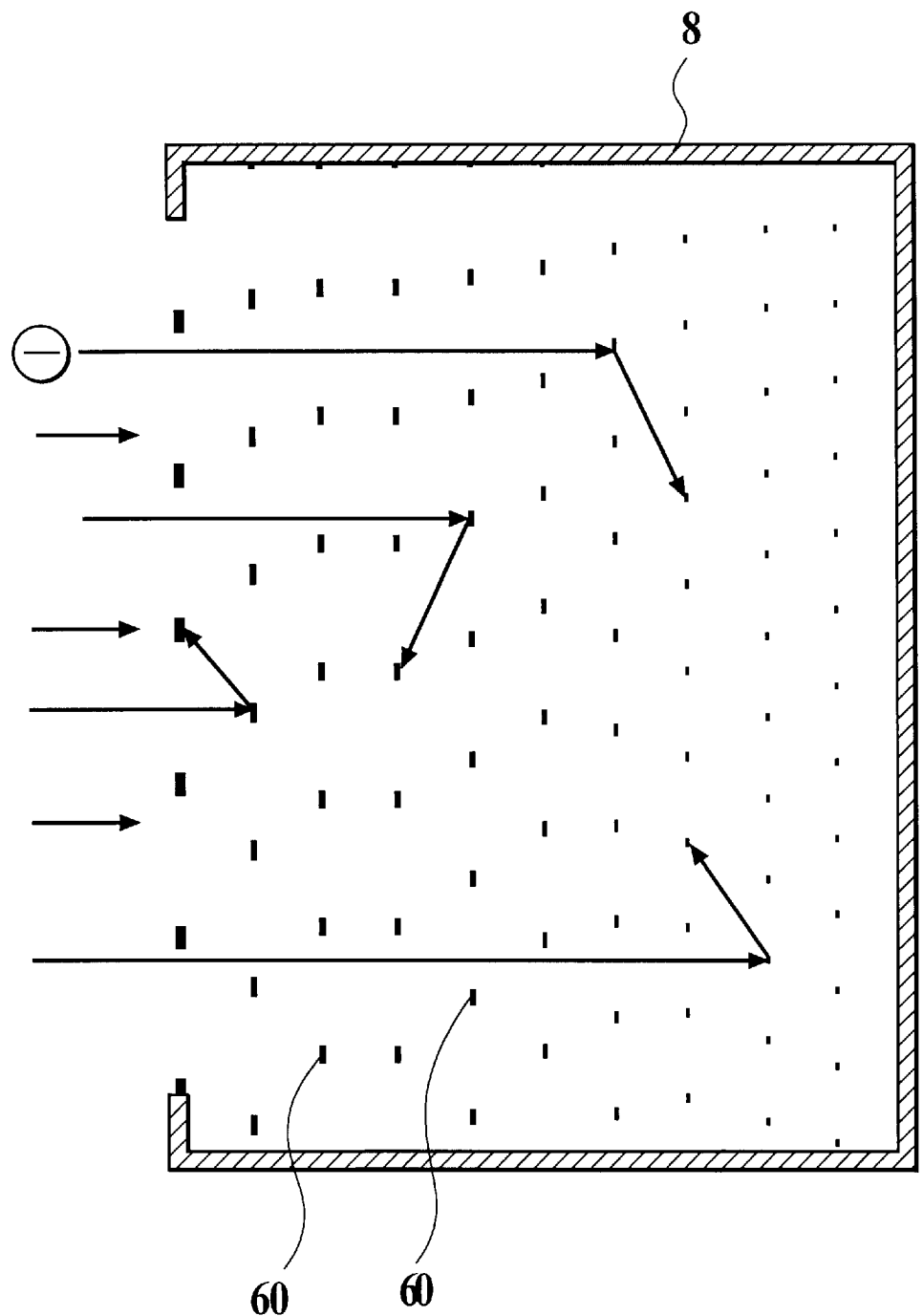
FIG. 11 is a perpendicular cross-sectional view to the metal meshes of the electron collector in FIG. 10.

Namely, in the electron collector 8 made of metallic fibers 50 or the metal meshes 60, the flying electrons emitted from the electron emitter 6 collide against metallic electrodes, the metallic fibers or the metal meshes, while entering the electron collector 8. Even if the electrodes reflect the flying electrons, they approach and collide against other neighboring metallic electrodes before flying out. This is because the metallic electrodes making up the electron collector 8 are disposed in all directions inside the electron collector 8. For this reason, the electron collector 8 eventually captures the flying electrons emitted from the electron emitter 6. Further, the flying electrons may emit secondary electrons when colliding against the metallic electrodes. In the same manner as the above, the secondary-emitted electrons approach and collide against other neighboring metallic electrodes and are absorbed in the electron collector 8 before flying out. (FIG. 11 is a perpendicular cross-sectional view to the metal meshes of the electron collector 8 in FIG. 10, and shows a schematic movement of the secondary-emitted electrons inside the electron collector 8.)

In other words, once the emitted electrons enter the interior of the electron collector 8, they cannot escape from the electron collector 8 due to the metallic electrodes disposed in all directions. The probability of the emitted electrons flying out can be drastically reduced thereby. The electron collector 8 captures almost all emitted electrons flying in a vacuum. As a result, the electron collector 8 formed out of metallic fibers has a higher probability in capturing the emitted electrons than that in the form of a metal plate having a rigid surface. If the probability in capturing the emitted electrons in a vacuum is increased, the efficiency in converting solar energy into electric energy is improved.

Figure 12:
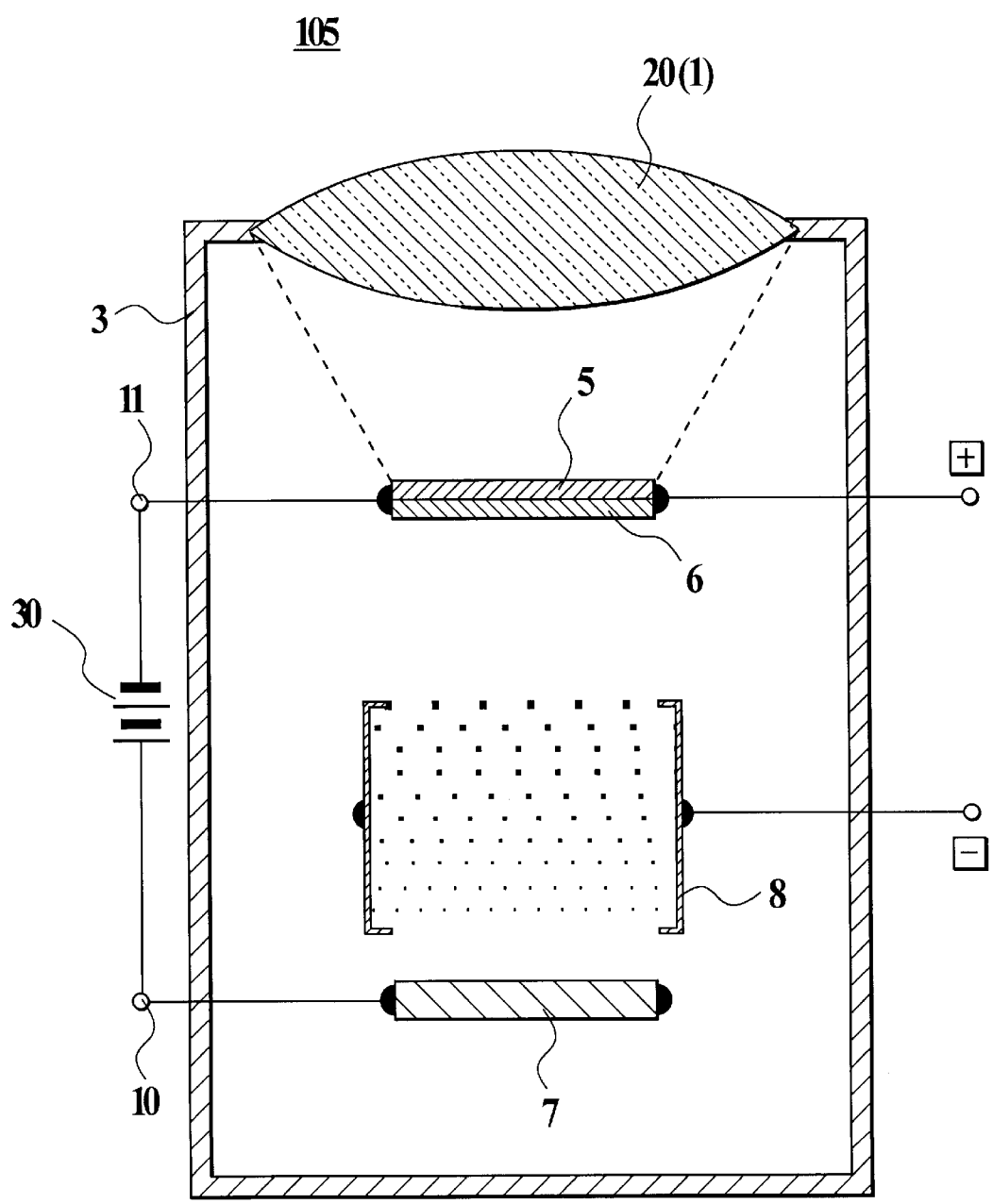
FIG. 12 is a cross-sectional view showing the solar energy converter having no electron deflector.

As shown in FIG. 12, the electron collector 8 in which the metal meshes made of mesh-shaped or grid-shaped metal wires are put in layers, can realize a solar energy converter 105 without the electron deflector 9.

According to the solar energy converter 105 shown in FIG. 12, the electron collector 8 has layered metal meshes to make gaps and space between its front and rear surfaces.

Namely, even if the electron accelerator 7 is disposed on the backside or at the back of the electron collector 8, an electric field can affect the flying electrons through the gaps or space of the electron collector 8. The electron accelerator 7 attracts the flying electrons. As a result, the flying electrons emitted from the electron emitter 6 are accelerated by the electron accelerator 7 and collide against the electron collector 8 without any deflection.

Figure 13:
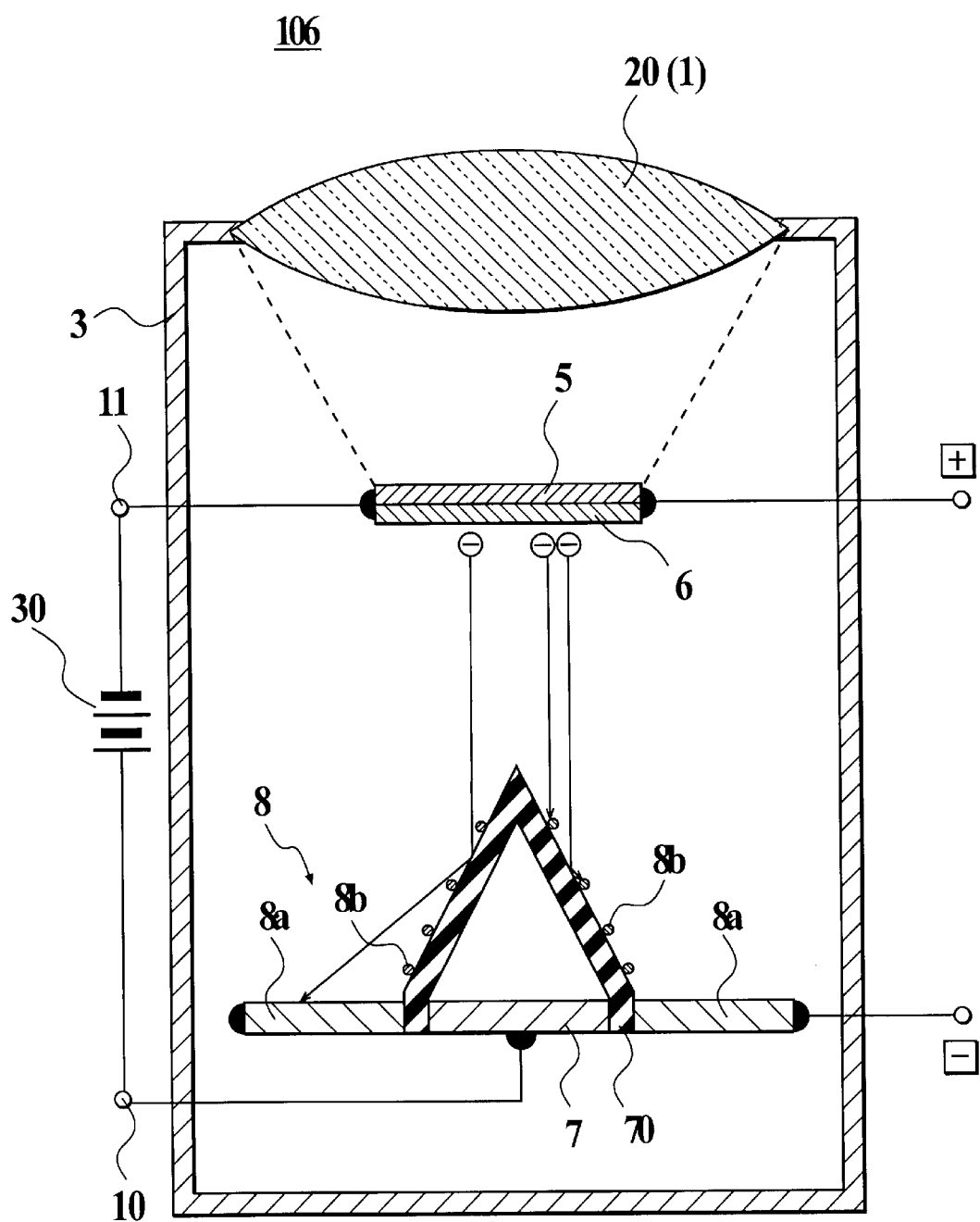
FIG. 13 is a cross-sectional view showing another embodiment of the solar energy converter having no electron deflector.

Tuning to FIG. 13, another embodiment of a solar energy converter 106 without an electron deflector is shown. In the solar energy converter 106, the electron collector 8 comprises a disc-shaped portion 8a, and a conical insulator 70 disposed in the center hole of the disc-shaped portion 8a in such a manner that the top of the conical insulator 70 is oriented to the electron emitter 6. Further, the electron collector 8 has a curved lineal portion 8b made of mesh-shaped, grid-shaped or spiral-shaped metal wires on the surface of the conical insulator 70. The electron accelerator 7 is disposed under the conical insulator 70. Since the electron accelerator 7 is covered with the conical insulator 70, the flying electrons cannot reach the electron accelerator 7. The conical insulator 70 is made of a solid and non-conductive material such as $SiO_2$.

When the electron accelerator 7 works, negative charges are concentrated on the internal surface of the conical insulator 70, and positive charges are distributed on the external surface of the conical insulator 70 owing to the attractive force of the electron accelerator 7. The electric lines of force starting from the positive charges reach the electron emitter 6 and form an electric field for accelerating emitted electrons. The emitted electrons are accelerated by the attractive of the electron accelerator 7. However, all the electrons are not necessarily absorbed in the curved lineal portion 8b of the conical insulator 70. The conical insulator 70 reflects some of them after collision, or some stay in the vicinity of the conical insulator 70. The emitted electrons reflected by the conical insulator 70 are absorbed by the disc-shaped portion 8a disposed around the conical insulator 70. On the other hand, the emitted electrons staying in the vicinity of the conical insulator 70 are slid on the surface of the conical insulator 70 by the electric field, and absorbed in the curved lineal portion 8b or the disc-shaped portion 8a of the electron collector 8.

Figure 14:
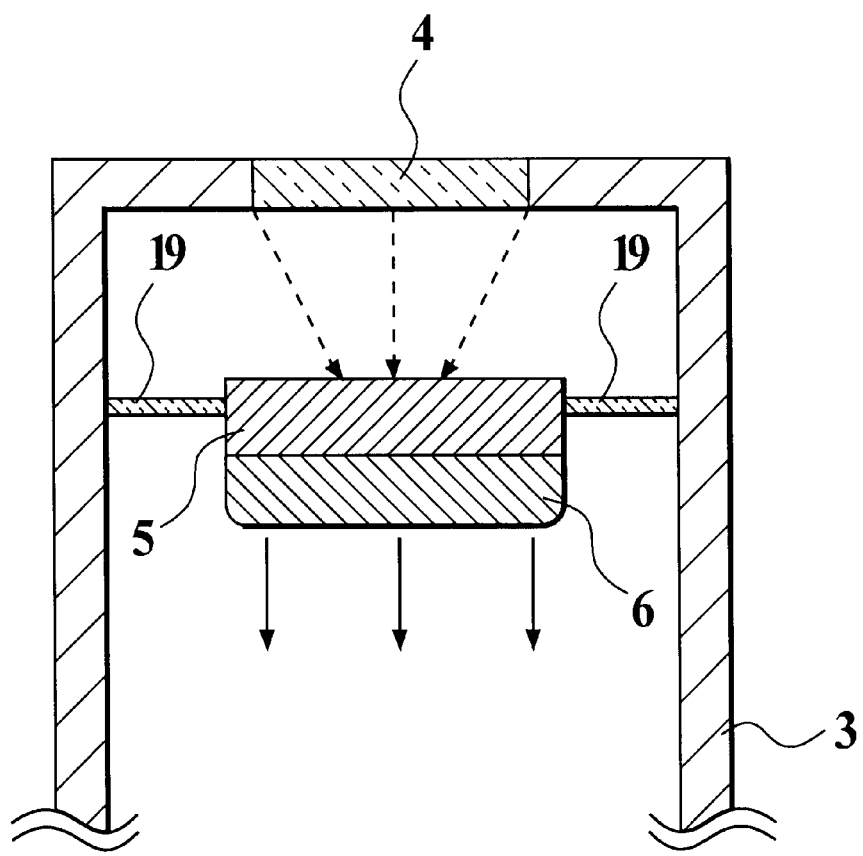
FIG. 14 is a cross-sectional view showing a sunlight penetration window and a fixing member of a heating plate provided around the sunlight penetration window of the solar energy converter in the present invention.

Turning to FIG. 14, a sunlight penetration window 4 provided in the vacuum vessel 3, and the heating plate 5 and the electron emitter 6 fixed to the vacuum vessel 3 are shown.

In the solar energy converter shown in FIG. 14 (a partial view), the sunlight penetration window 4, which is made of an optical transparent material, is provided in a partial region of the vacuum vessel 3. The sunlight passes through the sunlight penetration window 4 and irradiates the heating plate 5. (Arrows in broken lines show the sunlight.) The solar energy converter employing the sunlight penetration window 4 has less efficiency in raising the temperature of the heating the heating plate 5 than a solar energy converter employing a light-concentrating device 1 such as a convex lens. If it is necessary to enhance the efficiency in raising the temperature of the heating the heating plate 5, the light-concentrating device 1 can be set outside the vacuum vessel 3 for concentrating sunlight. In this case, the sunlight concentrated by the light-concentrating device 1 passes through the sunlight penetration window 4 and irradiates the heating plate 5.

Further, in the solar energy converter shown in FIG. 14 (a partial view), the heating plate 5 and the electron emitter 6 are fixed to the vacuum vessel 3 by a fixing member 19. The fixing member 19 is made of a non-thermally conductive material such as mica, ceramic or the like. This is because the non-thermally conductive material scarcely conducts the heat obtained by heating the heating plate 5 to the vacuum vessel 3 through the fixing member 19. Blocking the heat conduction results in the improvement of efficiently in emitting thermal electrons into a vacuum.

Figure 15:
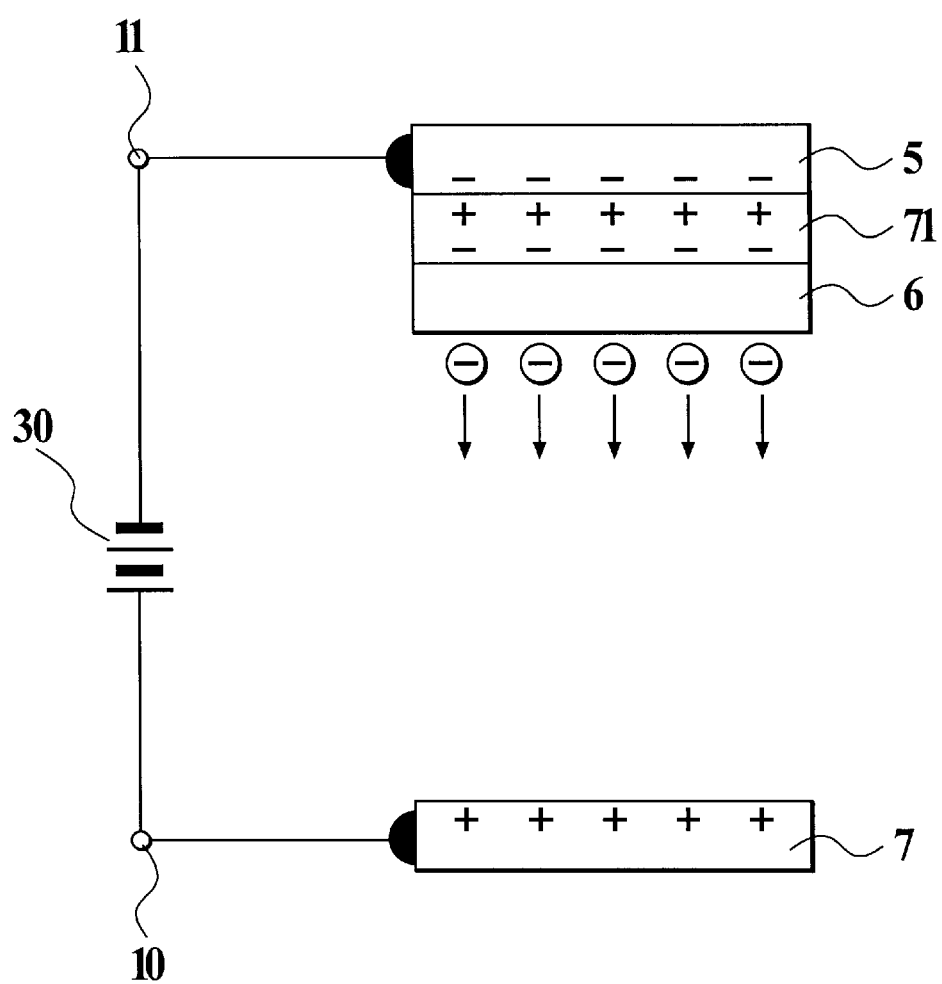
FIG. 15 is a side view showing an insulator sandwiched between a heating plate and an electron emitter.

Turning to FIG. 15, another embodiment of the connecting method of the heating plate 5 and the electron emitter 6 is shown.

In the embodiment shown in FIG. 14, the heating plate 5 and the electron emitter 6 are directly connected to each other. However, in the embodiment shown in FIG. 15, an insulator 71 is sandwiched between the heating plate 5 and the electron emitter 6. In this connection method, the heating plate 5 is heated by sunlight and the heat of the heating plate 5 is conducted to the electron emitter 6 through the insulator 71. Hence, this connection method is functionally same as the method shown in FIG. 14. If the temperature of the electron emitter 6 is raised, the thermal electrons can be easily emitted. Since the negative charges in the insulator 71 are located near the electron emitter 6 owing to the repulsive force of negative charges supplied from the electron accelerating power source 30, the thermal electrons are emitted into a vacuum.

Further, A material having a diamond structure, a carbon nanotube, and other carbon compounds or the like are used in this connection method. The insulator 71 cuts off an electron supply from the electron accelerating power source 30, and thereby the electron emitter 6 becomes short of electrons. Therefore, the electron emitter 6 considerably functions as a positive electrode of the solar energy converter, and the efficiency in converting the solar energy converter into electric energy is improved.

In this case, since the heating plate 5 and the electron emitter 6 are insulated from each other, the electrons are not supplied from the electron accelerating power source 30 to the emitter 6. Namely, since the insulator 71 cuts off current supplied from the electron accelerating power source 30, the electron emitter 6 becomes short of electrons and results in a positively charged electrode. Therefore, the electron emitter 6 effectively functions as a positive electrode of the battery. (Not illustrated, the electron collector 8 functions as a negative electrode of the battery.)

Figure 16:
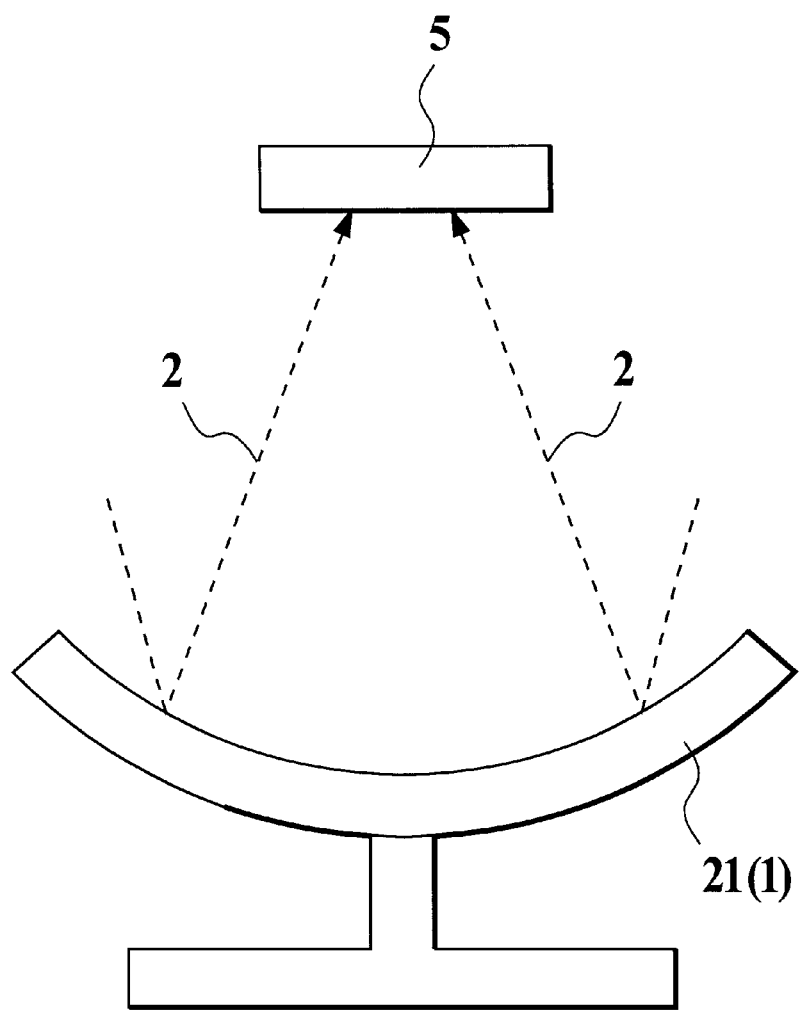
FIG. 16 is a view showing an example of a light-concentrating device using a concave mirror.

Turning to FIG. 16, an embodiment of the solar energy converter (a partial view) using a concave mirror 21 as the light-concentrating device 1 is shown. As shown in this figure, the sunlight 2 shown by the broken lines is reflected by the concave mirror 21 and concentrated in the heating plate 5 to raise the temperature of the heating plate 5. If the heating plate 5 is set in the neighborhood of the focal point of the concave mirror 21, the temperature of the heating plate 5 is efficiently raised by the concentrated sunlight. This realizes a solar energy converter having high efficiency in converting solar energy into electric energy.

Figure 17:
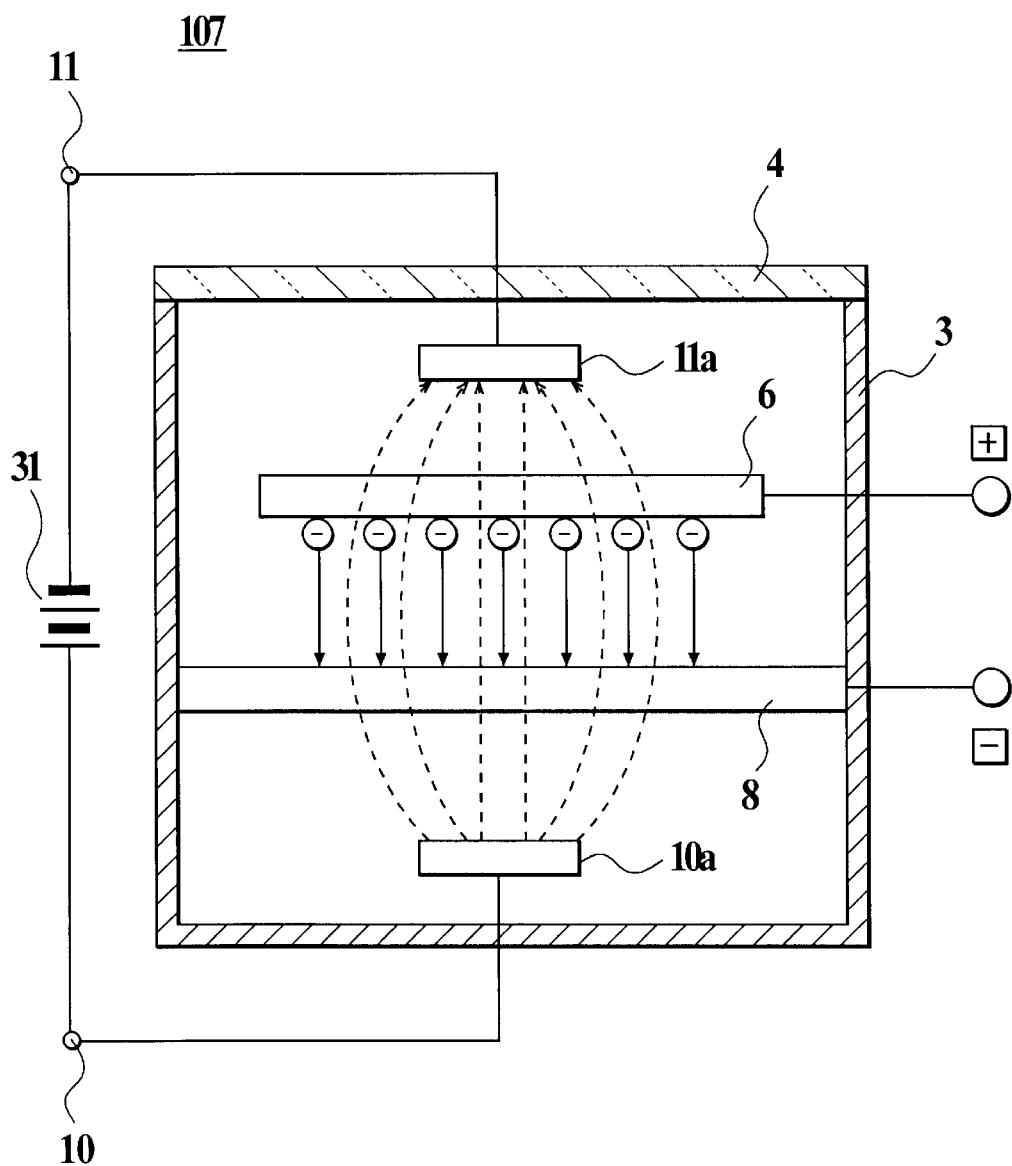
FIG. 17 is a side view showing the internal structure of the sectional vacuum vessel in the solar energy converter to which a field emission method is applied.

Turning to FIG. 17, a solar energy converter 107 employing the field emission method is shown.

The solar energy converter 107 shown in FIG. 17 comprises a vacuum vessel 3, a sunlight penetration window 4 provided in the vacuum vessel 3, a cathode 11a and an anode 10a provided opposite to each other in the vacuum vessel 3, the electron emitter 6 provided between the cathode 11a and the anode 10a, the electron collector 8 provided between the electron emitter 6 and the anode 10*a*, an electric-field generating power source 31 connected to the cathode 11*a* and the anode 10*a*.

When the negative terminal 11 of the electric-field generating power source 31, a direct current power source, is connected to the cathode 11*a*, its positive terminal 10 is connected to the anode 10*a*, and voltage is applied to the cathode 11*a* and anode 10*a*, an electric field such as the electric lines of force shown by the broken lines in FIG. 17 is generated. In this case, the electron emitter 6 and the electron collector 8, which are used for the solar energy converter 107 employing the field emission method, are the materials made of carbon such as a carbon nanotube. The electric lines of force starting from the anode 10*a* pass through the electron emitter 6 and electron collector 8, and reach the cathode 11*a* on the opposite side.

When the electron emitter 6, which is a carbon nanotube, is set in the electric field, the electrons in the carbon nanotube are concentrated in the nearest region to positive charges by the effect of Coulomb force. This phenomenon is called a point concentration of electric charges. This is caused by the small diameter of the narrow carbon nanotube. When the electric field applied to the carbon nanotube is larger than a threshold value for electron emission, some electrons concentrated at the point with a small radius of the carbon nanotube curvature are emitted into a vacuum. In particular, this carbon nanotube is an extremely narrow tube-shaped material with a diameter of several nanometers, so that it can emit electrons into a vacuum even in a weak electric field. The electrons emitted from the carbon nanotube are accelerated by the electric field, and fly toward a positive terminal, that is, the anode 10*a*. The flying electrons attracted by the anode 10*a* have no routes but to collide against the electron collector 8. Some of the flying electrons are absorbed in the collector 8 right after collision, some are reflected by the electron collector 8, and some generate the secondary-emitted electrons by colliding against the electron collector 8. However, almost all the flying electrons are eventually absorbed in the electron collector 8 due to the effect of the electric field. This is because the electric field necessarily has the flying electrons turned toward the electron collector 8.

For this reason, the electron collector 8 has excessive electrons, and is regarded as the negative electrode of the solar energy converter 107. On the other hand, the electron emitter 6 becomes short of electrons due to emission, and is regarded as the positive electrode of the solar energy converter 107. When an electric load such as a resistor is electrically connected to the negative and positive electrodes of the solar energy converter 107, the electrons absorbed by the electron collector 8 pass through the load resistor and return to the electron emitter 6. This circular phenomenon of the electrons makes it possible to utilize the electric energy.

When the electron emitter 6 is heated, the thermal electrons have enough energy to jump over an energy gap on the surface of the electron emitter 6. In other words, the electron emitter 6 must give the electrons enough energy for jumping over the gap. Namely, when the electron emitter 6 emits the electrons into a vacuum, it loses the same amount of energy as the emitted electrons have. The energy loss of the electron emitter 6 is a very little, however, it causes a decrease in temperature. For this reason, the electron emitter 6 cannot continue to emit electrons into a vacuum, unless the lost energy is covered. As for the solar energy converter 107 employing the field emission method, the electron emitter 6 can continuously emit electrons because the energy loss is replenished with the solar energy. As a result, the solar energy converter 107 having this structure can continuously generate electric energy.

Figure 18:
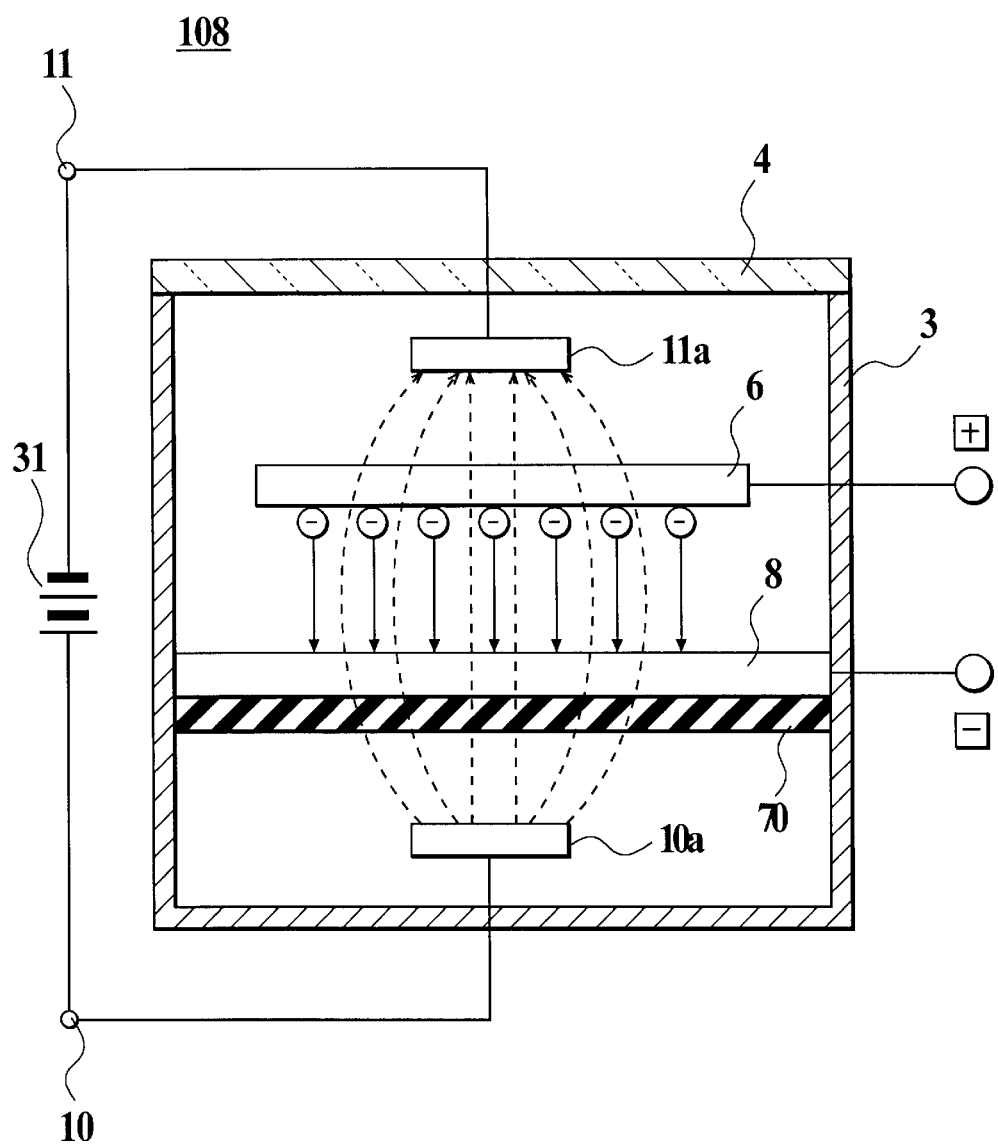
FIG. 18 is a side view showing the internal structure of the sectional vacuum vessel, i.e., an insulator disposed on an electron collector, in the solar energy converter to which a field emission method is applied.

Turning to FIG. 18, another solar energy converter 108 employing the field emission method is shown. In the solar energy converter 108 shown in FIG. 18, the insulator 70 is disposed on the anode 10*a* side of the electron collector 8. The insulator 70 can prevent the electrons from passing though the electron collector 8 and moving forward to the anode 10*a*. If the number of the electrons passing through the electron collector 8 is increased, the efficiency in converting solar energy into electric energy is decreased. This is because the number of the electrons passing through the electron collector 8 is regarded as an energy loss. To avoid this energy loss, the insulator 70 is provided on the anode 10*a* side of the electron collector 8. By this formation, the electrons trying to pass through the electron collector 8 collide against the insulator 70 and cannot reach the anode 10*a*. As a result, almost all the flying electrons are eventually absorbed in the electron collector 8. In this manner, the efficiency in converting solar energy into electric energy can be entirely enhanced by the insulator 70.

Figure 19:
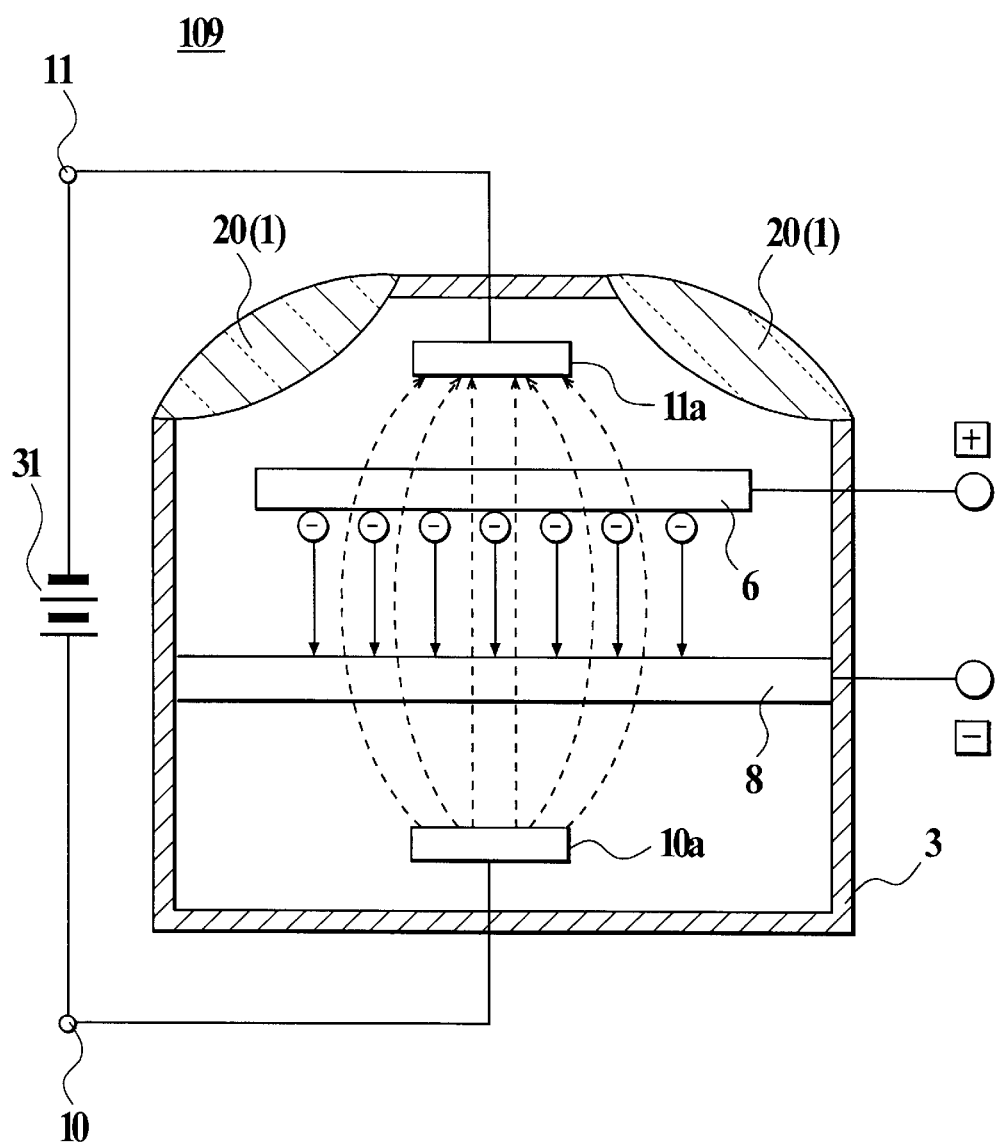
FIG. 19 is a side view showing another embodiment, i.e., the internal structure of the sectional vacuum vessel in the solar energy converter to which a field emission method is applied.

Turning to FIG. 19, another solar energy converter 109 employing the field emission method is shown. The solar energy converter 109 is provided with the convex lens 20 for efficiently supplying solar energy to the electron emitter 6.

Figure 20:
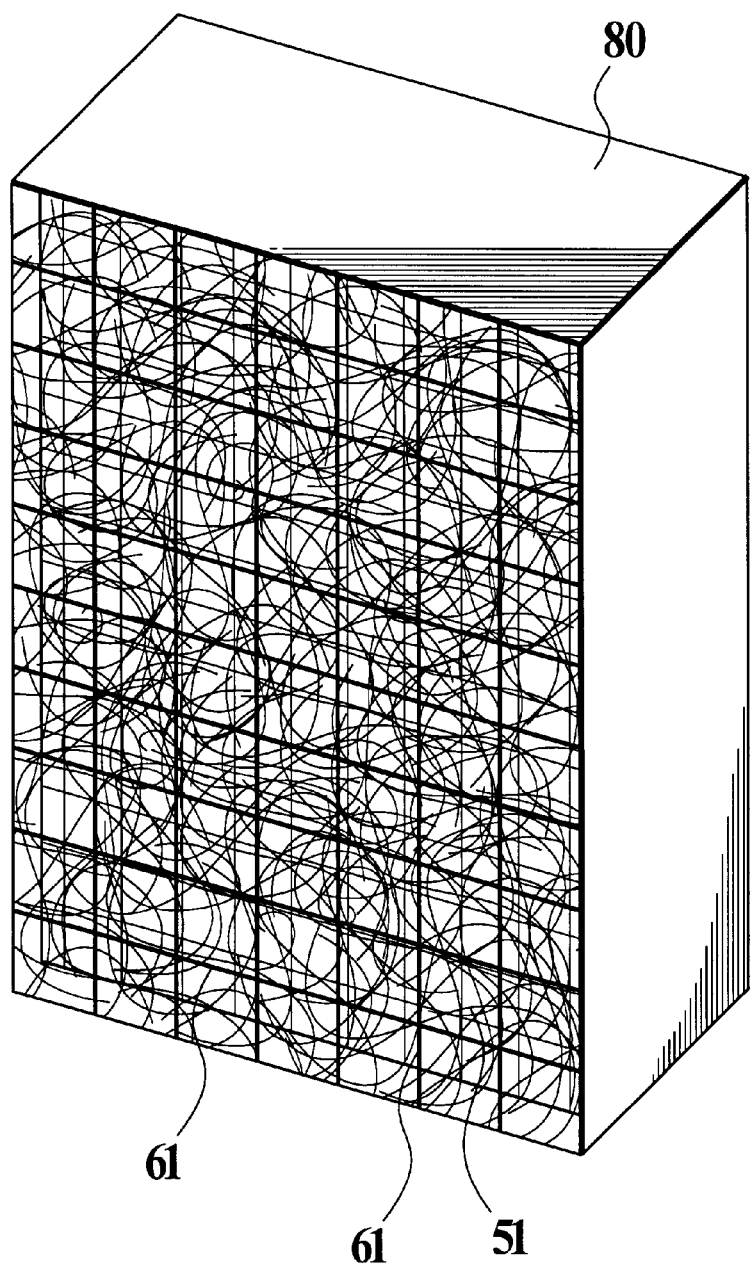
FIG. 20 is a perspective view showing an electron emitter and an electron collector of the solar energy converter to which a field emission method is applied, and showing an example of an electrode made of carbon nanotube in which a grid-shaped conductive member is disposed.

Turning to FIG. 20, an electrode 80, in which electrically conductive grids 61 are disposed in an electrode made of carbon nanotube 51, is shown.

Since the electric conductivity of carbon materials is inferior with respect to the particular direction, it has directionally high electric resistance. In order to efficiently generate electric energy, the electrically conductive grids 61 are disposed in the interior of the electrodes 80, that is, the electron emitter 6 and/or the electron collector 8. Since the conductive material is grid-shaped, the electrode 80 does not obstruct the electric field between the anode and cathode.

Figure 21:
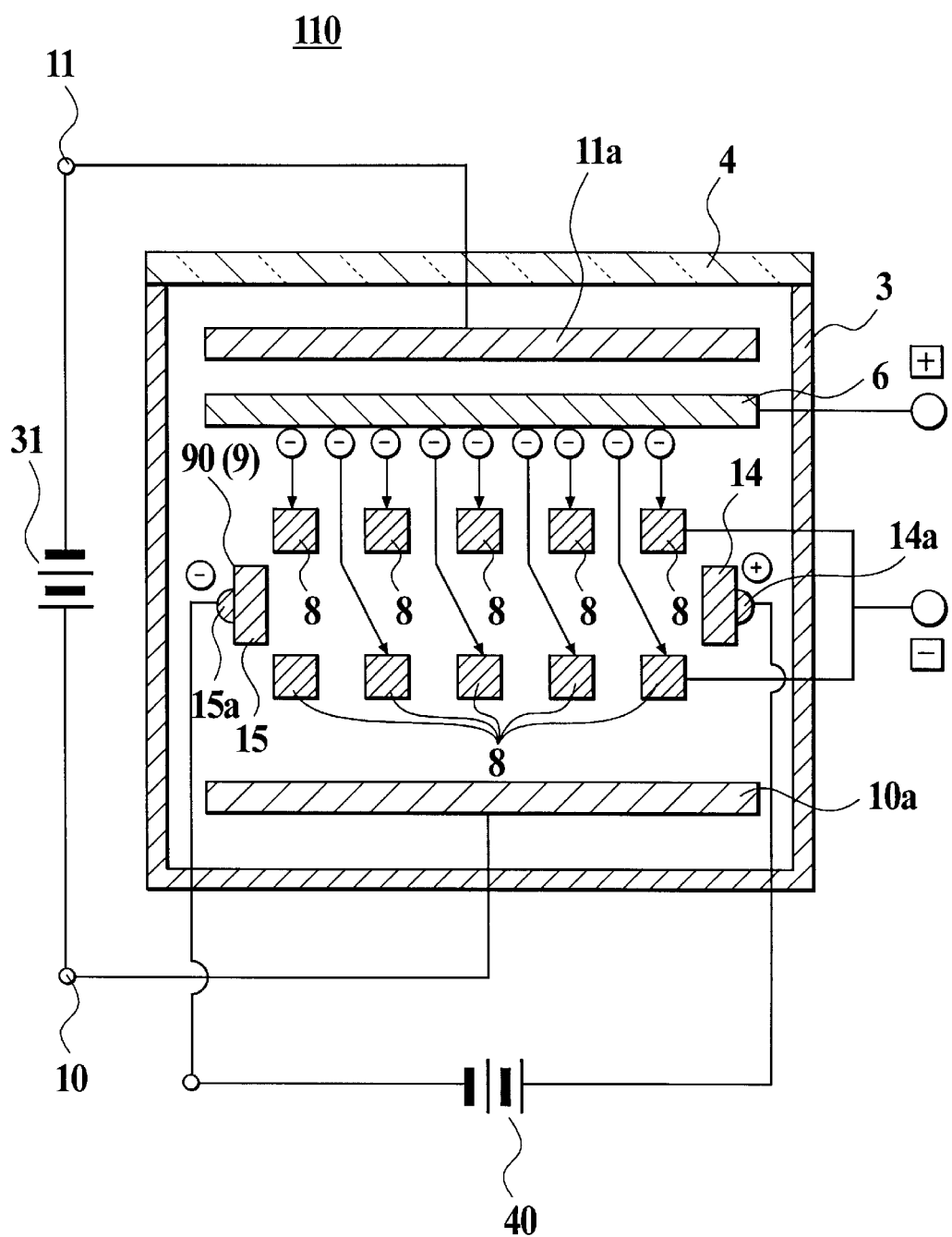
FIG. 21 is a perpendicular cross-sectional view to a slit-type electron collector showing another embodiment of the solar energy converter to which a field emission method is applied.

Turning to FIG. 21, a solar energy converter 110, in which an electrostatic deflector 90 used as the electron deflector 9 is added to the solar energy converter employing the field emission method, is shown.

The structure of the electron collector 8 and the electrostatic deflector 90 shown in FIG. 21 is the same as that of the electron collector 8 and the electrostatic deflector 90 shown in FIG. 8. The electrons emitted from the electron emitter 6 head for an anode 10*a*. The electrons having collided against the first slit-type electron collector 8 are absorbed in the first slit-type electron collector 8. The electrons having passed through the first slit-type of electron collector 8 are deflected by the electrostatic deflector 90 used as the electron deflector 9 and they collide against the second slit-type of electron collector 8, and eventually absorbed in the second slit-type electron collector 8.

Accordingly, the electron collector 8 has excessive electrons, and the electron collector 8 is regarded as the negative electrode of the solar energy converter 110. On the other hand, the electron emitter 6 becomes short of electrons due to emission, and the electron emitter 6 is regarded as the positive electrode of the solar energy converter 110. When an electric load such as a resistor is electrically connected to the negative and positive electrodes of the solar energy converter 110, the electrons collected in the electron collector 8, pass through the load resistor, and return to the electron emitter 6 that is short of electrons. This circular phenomenon of the electrons makes it possible to utilize the electric energy.

Figure 22:
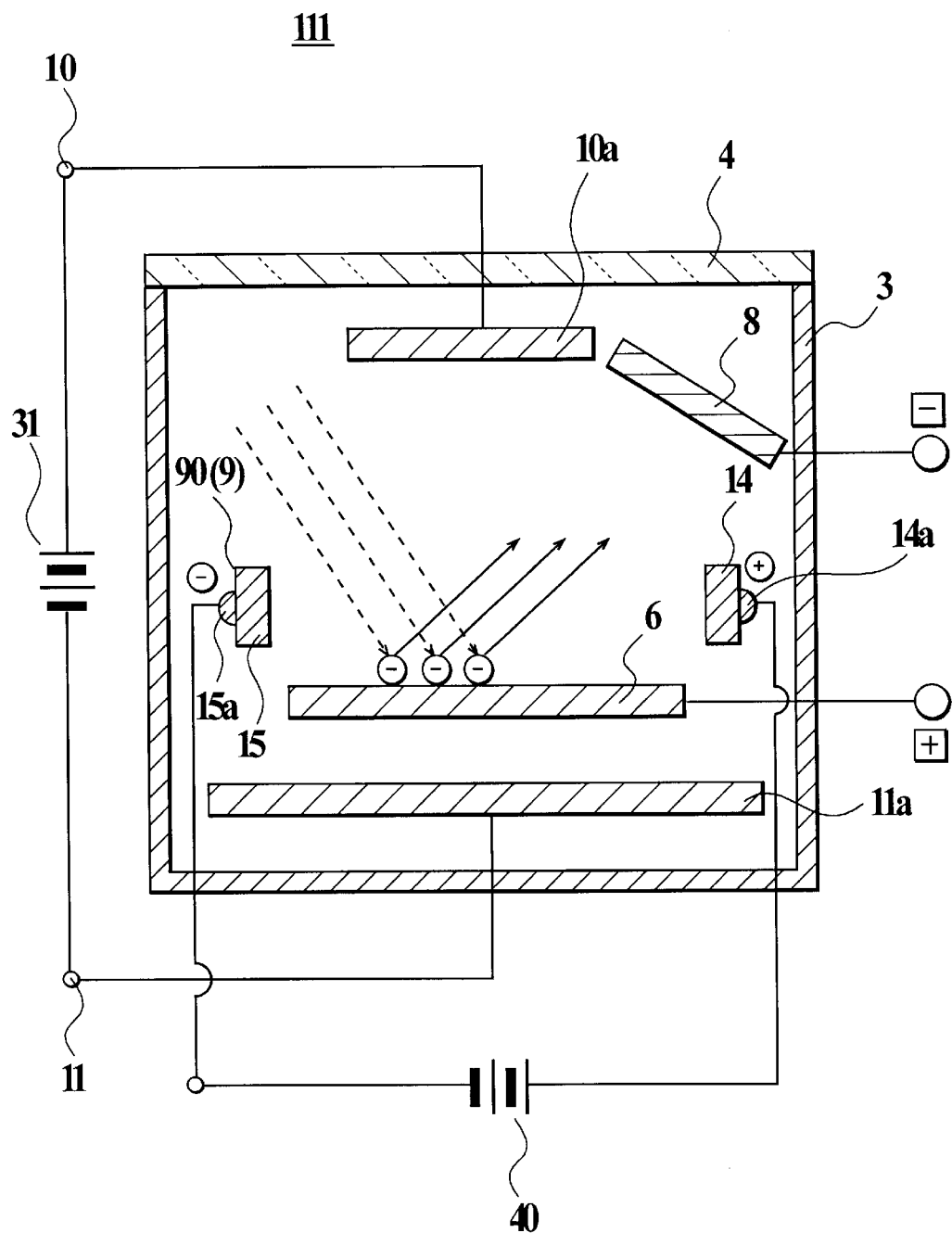
FIG. 22 is a cross-sectional view showing still another embodiment of the solar energy converter to which a field emission method is applied.

Turning to FIG. 22, another solar energy converter 111, in which an electrostatic deflector 90 used as the electron deflector 9 is added to the solar energy converter employing the field emission method, is shown.

In the solar energy converter having this structure, a material such as carbon nanotube, which absorbs electromagnetic wave energy and emits electrons, is suitable for the electron emitter 6.

Namely, the electron emitter 6 emits electrons due to the irradiation of electromagnetic wave such as sunlight, and the emitted electrons fly toward the anode owing to the affection of the electric field between the cathode and anode. The electron beam is deflected toward the positive side 14 by the electrostatic deflector 90. The flying electrons collide against the electron collector 8, and are absorbed in the electron collector 8.

Therefore, the electron collector 8 has excessive electrons, and the electron collector 8 is regarded as the negative electrode of the solar energy converter 111. On the other hand, the electron emitter 6 becomes short of electrons due to emission, and the electron emitter 6 is regarded as the positive electrode of the solar energy converter 111. When an electric load such as a resistor is electrically connected to the negative and positive electrodes of the solar energy converter 111, the electrons collected in the electron collector 8, pass through the load resistor, and return to the electron emitter 6 that is short of electrons. This circular phenomenon of the electrons makes it possible to utilize the electric energy.

In the structure of the solar energy converter 111 shown in FIG. 22, the sunlight is irradiated from the anode 10a, side. However, if the sunlight penetration window 4 is disposed on the cathode 11a side, the sunlight can be irradiated from the cathode 11a side.

The electrostatic deflector 90 is described as an example of the electron deflector 9 in FIGS. 21 and 22. However, the magnetic deflector 91 can be substituted for the electrostatic deflector 90.

Industrial Applicability

The solar energy converter in the present invention can convert solar energy in a wide range of sunlight spectrum into electric energy, and thereby excellent efficiency in converting solar energy into electric energy can be obtained.

Further, the solar energy converter in the present invention does not require special materials, which are hard to obtain, or high in a manufacturing cost, and has a simple structure. For this reason, the solar energy converter in the present invention can be manufactured at low cost and enable widespread availability.

Still further, since the vacuum vessel used for the solar energy converter in the present invention is manufactured by using glass or stainless steel, the solar energy converter is hard to degrade, durable, and long in operation-life. Moreover, the materials used for the solar energy converter are environmentally friendly, so that there is no problem with respect to the environment even if a large number of solar energy converters are used.

In the solar energy converter according to the present invention, since the electrodes are disposed inside a glass vessel, they are hard to deteriorate. For this reason, they can be used for a long period of time with a small maintenance cost.

Further, the solar energy converter in the present invention is lightweight and compact, so that it may be used in many places.

As described above, the solar energy converter of the present invention has an extremely high practical use due to above-mentioned characteristics.

What is claimed is:

1. A solar energy converter comprising:
   a light-concentrating device for concentrating sunlight;
   a heating plate provided in a vacuum vessel, irradiated with sunlight concentrated by said light-concentrating device;
   an electron emitter, which is thermally connected to said heating plate, provided in said vacuum vessel for emitting electrons into a vacuum due to a rise in temperature of said heating plate;
   an electron accelerate provided opposite to said electron emitter in said vacuum vessel;
   an electron accelerating power source in which its negative terminal is connected to said electron emitter and its positive terminal is connected to said electron accelerator;
   an electron defector provided in said vacuum vessel for deflecting an electron beam starting from said electron emitter; and
   an electron collector for collecting flying electrons deflected by said electron deflector,
   wherein said electron collector is regarded as a negative electrode and said electron emitter is regarded as a positive electrode by moving the electrons from said electron emitter to said electron collector, and thereby electricity is generated.

2. A solar energy converter comprising:
   a concentrating device for concentrating sunlight;
   a heating plate provided in a vacuum vessel and irradiated with sunlight concentrated by said light-concentrating device;
   an electron emitter, which is thermally connected to said heating plate, provided in said vacuum vessel for emitting electrons into a vacuum due to a rise in temperature of said heating plate;
   an electron accelerator provided opposite to said electron emitter in said vacuum vessel;
   an electron accelerating power source in which its negative terminal is connected to said electron emitter, and its positive terminal is connected to said electron accelerator;
   a first slit electron collector provided between said electron emitter and said electron accelerator for collecting flying electrons emitted from said electron emitter, said first slit electron collector having first slits;
   a second slit electron collector provided between said first slit electron collector and said electron accelerator, said second slit electron collector having second slits, wherein electric lines of force pass through the second slits; and
   an electron deflector provided in said vacuum vessel for deflecting an electron beam which passes through the first slits of said first slit electron collector in such a manner that said second slit electron collector captures and collects the flying electrons,
   wherein that said electron collector is regarded as a negative electrode and said electron emitter is regarded as a positive electrode by moving the electrons from said electron emitter to said electron collector, and thereby electricity is generated.

3. The solar energy converter according to claim 1, wherein said electron deflector comprises either a magnetic deflector or an electrostatic deflector.

4. The solar energy converter according to claim 1, wherein an electron capturing portion made of metallic fibers or mesh-shaped or grid-shaped metal wires for capturing the flying electrons is formed on a surface of said electron collector.

5. A solar energy converter comprising:
   a light-concentrating device for concentrating sunlight;
   a heating plate provided in a vacuum vessel and irradiated with sunlight concentrated by said light-concentrating device;
   an electron emitter, which is thermally connected to said heating plate, provided in said vacuum vessel for emitting electrons into a vacuum due to a rise in temperature of said heating plate;
   an electron accelerator provided opposite to said electron emitter in said vacuum vessel;
   an electron accelerator power source in which its negative terminal is connected to said electron emitter and its positive terminal is connected to said electron accelerator; and
   an electron collector provided between said electron emitter and said electron accelerator for collecting flying electrons emitted from said electron emitter,
   wherein said electron collector comprises metallic fibers or mesh-shape or grid-shaped metal wires, said electron collector is regarded as a negative electrode and said electron emitter is regarded as a positive electrode by moving the electrons from said electron emitter to said electron collector, and thereby electricity is generated.

6. A solar energy converter comprising:
   a light-concentrating device for concentrating sunlight;
   a heating plate provided in a vacuum vessel and irradiated with sunlight concentrated by said light-concentrating device;
   an electron emitter, which is thermally connected to said heating plate, provided in said vacuum vessel for emitting electrons into a vacuum due to a rise in temperature of said heating plate;
   an electron accelerator provided opposite to said electron emitter in said vacuum vessel;
   an electron accelerator power source in which its negative terminal is connected to said electron emitter and its positive terminal is connected to said electron accelerator; and
   an electron collector provided between said electron emitter and said electron accelerator for collecting flying electrons emitted from said electron emitter,
   wherein said electron accelerator and said electron collector are electrically insulated from each other, and said electron collector is regarded as a positive electrode by moving the electrons from said electron emitter to said electron collector, and thereby electricity is generated.

7. The solar energy converter according to claim 5, wherein said electron emitter contains or is coated with a compound which comprises at least one selected from the group consisting of iridium, scandium, barium and carbon.

8. The solar energy converter according to claim 5, wherein said electron collector comprises one selected from the group consisting of stainless steel, molybdenum compound and tungsten compound.

9. The solar energy converter according to claim 5, wherein at least one of said heating plate and said electron collector is processed to a blackbody.

10. The solar energy converter according to claim 5, wherein an electron-leakage preventing member is formed for preventing the flying electrons from leaking to said electron accelerator after collision against said electron collector.

11. The solar energy converter according to claim 5, wherein said electron collector is curved on the side of said electron emitter in such a manner that the center of its curvature is located on the side of said electron emitter.

12. The solar energy converter according to claim 5, wherein a sunlight penetration window is formed in a partial region of said vacuum vessel to allow sunlight concentrated by said light-concentrating device to penetrate said vacuum vessel.

13. The solar energy converter according to claim 5, wherein said heating plate is fixed to said vacuum vessel by using a fixing member comprising a non-thermally conductive material.

14. The solar energy converter according to claim 5, wherein an insulator is sandwiched between said heating plate and said electron emitter disposed in said vacuum vessel.

15. A solar energy converter comprising:
    a cathode and an anode provided opposite to each other in a vacuum vessel;
    an electric-field generating power source provided for generating an electric field between said cathode and said anode by connecting its negative terminal to said cathode and its positive terminal to said anode;
    an electron emitter extending through the electric field, provided between said cathode and said anode in said vacuum vessel, for emitting electrons into a vacuum due to sunlight heat; and
    an electron collector extending through the electric field, provided between said electron emitter and said anode in said vacuum vessel, for collecting the electrons emitted from said electron emitter,
    wherein said electron collector is regarded as a negative electrode and said electron emitter is regarded as a positive electrode by moving the electrons from said electron emitter to said electron collector, thereby electricity is generated.

16. A solar energy converter comprising:
    a cathode and an anode provided opposite to each other in a vacuum vessel;
    an electric-field generating power source provided for generating an electric field between said cathode and said anode by connecting its negative terminal to said cathode and its positive terminal to said anode;
    an electron emitter extending through the electric field, provided between said cathode and said anode in said vacuum vessel, for emitting electrons into a vacuum due to sunlight heat;
    a first slit electron collector provided between said electron emitter and said anode for collecting flying electrons emitted from said electron emitter, said first split electron collector having first slits;
    a second slit electron collector provided between said first slit electron collector and said anode, said second slit electron collector having second slits, wherein electric lines of force pass through the second slits; and
    an electron deflector provided in said vacuum vessel for deflecting an electron beam having passed through the first slits of said first slit electron collector in such a manner that said second slit electron collector collects the deflected flying electrons,
    wherein said electron collector is regarded as a negative electrode and said electron emitter is regarded as a positive electrode by moving the electrons from said electron emitter to said electron collector, and thereby electricity is generated.

17. A solar energy converter comprising:

a cathode and an anode provided opposite to each other in a vacuum vessel;

an electric-field generating power source provided for generating an electric field between said cathode and said anode by connecting its negative terminal to said cathode and its positive terminal to said anode;

an electron emitter extending through the electric field, provided between said cathode and the anode in said vacuum vessel, for emitting electrons into a vacuum due to a rise in temperature from sunlight heat;

an electron deflector provided in said vacuum vessel, for deflecting an electron beam starting from said electron emitter; and an electron collector provided for collecting the electron beam which is deflected by said electron deflector, wherein said electron collector is regarded as a negative electrode and said electron emitter is regarded as a positive electrode by moving the electrons from said electron emitter to said electron collector, and thereby electricity is generated.

18. The solar energy converter according to claim 15, wherein an insulator is provided on a side of the anode of said electron collector.

19. The solar energy converter according to claim 15, wherein a sunlight penetration window is formed in a partial region of said vacuum vessel for passing sunlight through said vacuum vessel, and said electron emitter is irradiated with the sunlight.

20. The solar energy converter according to claim 15, wherein a light-concentrating device is provided for concentrating sunlight, and said electron emitter is irradiated with the sunlight concentrated by said light-concentrating device.

21. The solar energy converter according to claim 15 further comprising a light-concentrating device for concentrating sunlight, wherein said light-concentrating device is provided with either a lens or a concave mirror.

22. The solar energy converter according to claim 15, wherein at least said electron emitter selected from said electron emitter and said electron collector comprises a carbon material.

23. The solar energy converter according to claim 15, wherein at least said electron emitter selected from said electron emitter and said electron collector comprises a material having a diamond structure.

24. The solar energy converter according to claim 15, wherein at least said electron emitter selected from said electron emitter and said electron collector comprises a carbon nanotube.

25. The solar energy converter according to claim 15, wherein at least one of said electron emitter and said electron collector is provided with fiber-shaped, mesh-shaped, or grid-shaped conductive member.

26. The solar energy converter according to claim 15, wherein said electron emitter comprises one selected from the group consisting of a material made of carbon, a material having a diamond structure, a carbon nanotube, and combinations thereof, and said electron collector comprises one selected from the group consisting of a material made of carbon, a material having a diamond structure, a carbon nanotube, and combinations thereof.

27. The solar energy converter according to claim 15, wherein said electron collector comprises one selected from the group consisting of stainless steel, molybdenum compound, tungsten compound and carbon compound.

28. The solar energy converter according to claim 16, wherein said electron deflector is provided with either a magnetic deflector or an electrostatic deflector.

* * * * *

UNITED STATES PATENT AND TRADEMARK OFFICE
CERTIFICATE OF CORRECTION

PATENT NO. : 6,653,547 B2
DATED : November 25, 2003
INVENTOR(S) : Norio Akamatsu It is certified that error appears in the above-identified patent and that said Letters Patent is hereby corrected as shown below:

<u>Title page,</u>
Item [30], Foreign Application Priority Data, add
-- PCT No. WO/JP01/03715 filed April 27, 2001 --

Signed and Sealed this

Twenty-seventh Day of April, 2004

JON W. DUDAS
*Acting Director of the United States Patent and Trademark Office*